(12) United States Patent
Ross et al.

(10) Patent No.: US 11,915,503 B2
(45) Date of Patent: Feb. 27, 2024

(54) DEPTH-BASED DIGITAL FINGERPRINTING

(71) Applicant: ALITHEON, INC., Bellevue, WA (US)

(72) Inventors: David Justin Ross, Bellevue, WA (US);
Will Charles Shannon, Bellevue, WA (US); Cheng Qian, Bellevue, WA (US); Robert Saxon Ross, Bellevue, WA (US)

(73) Assignee: Alitheon, Inc., Bellevue, WA (US)

( * ) Notice: Subject to any disclaimer, the term of this patent is extended or adjusted under 35 U.S.C. 154(b) by 218 days.

(21) Appl. No.: 17/160,586

(22) Filed: Jan. 28, 2021

(65) Prior Publication Data

US 2021/0233203 A1 Jul. 29, 2021

Related U.S. Application Data

(60) Provisional application No. 62/967,009, filed on Jan. 28, 2020.

(51) Int. Cl.
*G06V 20/64* (2022.01)
*G06T 1/00* (2006.01)
(Continued)

(52) U.S. Cl.
CPC .......... *G06V 20/653* (2022.01); *G06T 1/0064* (2013.01); *G06V 10/761* (2022.01); *G06V 20/80* (2022.01); *G06T 2200/04* (2013.01)

(58) Field of Classification Search
None
See application file for complete search history.

(56) References Cited

U.S. PATENT DOCUMENTS

| 4,218,674 A | 8/1980 | Brosow et al. |
| 4,423,415 A | 12/1983 | Goldman |

(Continued)

FOREIGN PATENT DOCUMENTS

| DE | 102006005927 A1 | 8/2007 |
| EP | 0439669 A2 | 8/1991 |

(Continued)

OTHER PUBLICATIONS

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.

(Continued)

*Primary Examiner* — Anand P Bhatnagar
(74) *Attorney, Agent, or Firm* — Brake Hughes Bellermann LLP

(57) ABSTRACT

Digital fingerprints include data indicative of interior features or structures of an object. The physical object may be rigid or malleable. The digital fingerprints may also include data indicative of features on an exterior surface of the object. Digital fingerprints may uniquely identify an object with respect to other objects, even with respect to other objects of a same type or class of objects. The technology may be relatively invariant to changes in scale, rotation, affine, homography, perspective, and illumination as between a reference digital fingerprint and a later acquired or generated digital fingerprint. Digital fingerprints may be used to authenticate an object as being a second instance or appearance of a previously digitally fingerprinted object.

28 Claims, 13 Drawing Sheets

(51) Int. Cl.
  *G06V 20/80* (2022.01)
  *G06V 10/74* (2022.01)

(56) References Cited

U.S. PATENT DOCUMENTS

| | | | |
|---|---|---|---|
| 4,677,435 A | 6/1987 | Causse et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 * | 12/2006 | Nagel ............ G06K 19/086 |
| | | | 705/76 |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 * | 3/2010 | Boutant ............ G06V 20/80 |
| | | | 382/141 |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B1 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 * | 8/2013 | Spitzig ............ G07B 17/00467 |
| | | | 382/176 |
| 8,526,743 B1 | 9/2013 | Campbell et al. |
| 8,774,455 B2 | 7/2014 | Elmenhurst et al. |
| 8,959,029 B2 | 2/2015 | Jones et al. |
| 9,031,329 B1 | 5/2015 | Farid et al. |
| 9,058,543 B2 | 6/2015 | Campbell et al. |
| 9,122,902 B2 * | 9/2015 | Kamakura ......... G06V 40/1312 |
| 9,152,862 B2 | 10/2015 | Ross et al. |
| 9,170,654 B1 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,614,302 B2 | 4/2020 | Withrow et al. |
| 10,621,594 B2 | 4/2020 | Land et al. |
| 10,740,767 B2 | 8/2020 | Withrow |
| 10,915,612 B2 * | 2/2021 | Withrow ............... B29C 64/386 |
| 10,936,838 B1 | 3/2021 | Wong |
| 11,062,118 B2 * | 7/2021 | Ross ...................... G06T 17/00 |
| 11,379,856 B2 * | 7/2022 | Withrow ............. G06Q 30/018 |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |

(56) References Cited

U.S. PATENT DOCUMENTS

| | | |
|---|---|---|
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0056041 A1 | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0005578 A1 | 1/2008 | Shafir |
| 2008/0008377 A1 | 1/2008 | Andel et al. |
| 2008/0011841 A1 | 1/2008 | Self et al. |
| 2008/0013804 A1 | 1/2008 | Moon et al. |
| 2008/0016355 A1 | 1/2008 | Beun et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0287498 A2 | 11/2009 | Choi |
| 2009/0307005 A1 | 12/2009 | Omartin et al. |
| 2010/0027834 A1* | 2/2010 | Spitzig ................ G06V 30/186 382/218 |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0110719 A1 | 5/2013 | Carter et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0110364 A1 | 4/2015 | Niinuma et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034913 A1 | 2/2016 | Zavarehi et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0072626 A1 | 3/2016 | Kouladjie |
| 2016/0117631 A1 | 4/2016 | McCloskey et al. |
| 2016/0162734 A1 | 6/2016 | Ross et al. |
| 2016/0180485 A1 | 6/2016 | Avila et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0076132 A1 | 3/2017 | Sezan et al. |
| 2017/0132458 A1 | 5/2017 | Short et al. |
| 2017/0153069 A1 | 6/2017 | Huang et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | MacIntosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0000359 A1 | 1/2018 | Watanabe |
| 2018/0012008 A1 | 1/2018 | Withrow et al. |
| 2018/0018627 A1* | 1/2018 | Ross .................... G06Q 50/28 |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1* | 2/2018 | Ross .................... G06F 16/5838 |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |

(56) References Cited

U.S. PATENT DOCUMENTS

| | | |
|---|---|---|
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1 | 7/2019 | Withrow et al. |
| 2019/0266373 A1 | 8/2019 | Hirokawa |
| 2019/0279017 A1 | 9/2019 | Graham et al. |
| 2019/0287118 A1 | 9/2019 | Ross et al. |
| 2019/0342102 A1 | 11/2019 | Hao et al. |
| 2019/0362186 A1 | 11/2019 | Irshad et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Shannon et al. |
| 2020/0334689 A1 | 10/2020 | Withrow |
| 2020/0349379 A1 | 11/2020 | Ross |
| 2020/0356772 A1 | 11/2020 | Withrow et al. |
| 2021/0312158 A1* | 10/2021 | Ross ............... G06V 20/80 |

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3267384 A1 | 1/2018 |
| EP | 3270342 A1 | 1/2018 |
| EP | 3435287 A2 | 1/2019 |
| EP | 3514715 A1 | 7/2019 |
| GB | 2097979 A | 11/1982 |
| GB | 2482127 A | 1/2012 |
| JP | 61234481 A | 10/1986 |
| JP | H07192112 | 7/1995 |
| JP | 2007213148 A | 8/2007 |
| JP | 2010146158 A | 7/2010 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2010018646 A1 | 2/2010 |
| WO | 2012145842 A1 | 11/2012 |
| WO | 2013051019 A1 | 4/2013 |
| WO | 2013126221 A1 | 8/2013 |
| WO | 2013173408 A1 | 11/2013 |
| WO | 2015004434 A1 | 1/2015 |
| WO | 2016081831 A1 | 5/2016 |

OTHER PUBLICATIONS

Bao et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Cavoukian et al. "Biometric Encryption: Technology for Strong Authentication, Security and Privacy," 2008, WE, Intl. Fed. Iot Info Processing, vol. 261; Policies and Research in Identity Management; pp. 57-77.

Di Paola et al., "An Autonomous Mobile Robotic System for Surveillance of Indoor Environments," International Journal of Advanced Robotic Systems 7(1): 19-26, 2010.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Ebay, "eBay Launches Must-Have !Phone App Red Laser 3.0" published Nov. 18, 2011; https://www.ebayinc.com/stories/news/ebay-launches-must-have-iphone-app-redlaser-30/, downloaded Mar. 21, 2019, 7 pages).

Entropy.com Website History, Wayback Machine; https://web.archive.org/web/20160330060808/https://www.entrupy.com/; Mar. 30, 2016 (Year: 2016), 2 pages.

Extended European Search Report Application No. 21153877.2, dated Jun. 15, 2021, 8 pages.

Farid, "Digital Image Forensics", Dartmouth CS 89/189, Sprint 2013; 199 pages.

Fischler et al., "Random Sample Consensus: A Paradigm for Model Fitting with Applications to Image Analysis and Automated Cartography," Communication of the ACM 24(6); 381-395, 1981.

Huang et al., "A Novel Binarization Algorithm for Ballistic Imaging Systems," 3rd International Congress on Image and Signal Processing, Yantai, China, Oct. 16-18, 2010, pp. 1287-1291.

Huang, et al., "An Online Ballistics Imaging System for Firearm Identification"; 2nd International Conference on Signal Processing Systems, Dalian, China, Jul. 5-7, 2010, vol. 2, pp. 68-72.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Li, "Firearm Identification System Based on Ballistics Image Processing," Congress on Image and Signal Processing, School of Computer and Information Science, Faculty of Computing, Health and Science Edith Cowan University, Perth, Australia pp. 149-154.

Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.

Matsumoto et al., "Nano-artifact metrics based on random collapse of resist," Scientific Reports 4:6142, 2014 (5 pages).

Mistry et al., "Comparison of Feature Detection and Matching Approaches: SIFT and SURF," Global Research and Development Journal for Engineering, vol. 2, Issue 4, Mar. 2017, 8 pages.

Online NCOALink® Processing Acknowledgement Form (PAF) Released by Lorton Data, Jun. 2, 2009, URL=http://us.generation-nt.com/online-ncoalink-processingacknowledgement-form-paf-released-by-press-1567191.html, download date Jun. 25, 2010, 2 pages.

Rublee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Schwabe Williamson & Wyatt, PC—Listing of Related Cases; dated Sep. 16, 2017; 2 pages.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Shi et al., "Smart Cameras: Fundamentals and Classification," Chapter 2, Belbachir (ed.), Smart Cameras, Springer, New York, New York, USA 2010, pp. 19-34.

(56) References Cited

OTHER PUBLICATIONS

Shields, "How to Shop Savvy With Red Laser," published online on Mar. 22, 2010; https ://i phone .appstomn .net/ reviews/lifestyle/how-to-shop-savvy-with-redlaser /, downloaded Mar. 22, 2010, 8 pages).
Smith, "Fireball: A Forensic Ballistic Imaging System: Proceedings of the 31st Annual International Carnahan Conference on Security Technology," Canberra, Australia, Oct. 15-17, 1997, pp. 64-70.
Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.
United States Postal Service, "NCOALink Systems", http://www.usps.com/ncsc/addressservices/moveupdate/changeaddress.htm, website accessed Jun. 23, 2010, 2 pages.
United States Postal Service, "Postal Addressing Standards," Publication Jul. 28, 2008, 55 pages.
United States Postal Services, NCOALink® Systems, dated May 27, 2009, URL=http://ribbs.usps.gov/ncoalink/ncoalink_print.htm, download date Jun. 23, 2010, 3 pages.
Veena et al., "Automatic Theft Security System (Smart Surveillance Camera)," Computer Science & Information Technology 3:75-87, 2013.
Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.
Farid, Ahmed , et al., "Integrated fingerprint verification method using a composite signature-based watermarking technique", Optical Engineering, The Catholic University of America, (Year: 2007), 6 pages.
Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.
Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.
Zaeri, Naser , "Minutiae-based Fingerprint Extraction and Recognition, 2020 (year 2010)", 47 pages.
Extended European Search Report, dated Aug. 18, 2021, for European Application No. 21164207.9—17 pages.
Extended European Search Report, dated Aug. 18, 2021, for European Application No. 21164207.9, 13 pages.
Extended European Search Report, dated Aug. 19, 2021, for European Application No. 21164353.1, 9 pages.
Extended European Search Report, dated Jul. 27, 2021, for European Application No. 21164403.4, 8 pages.
Final Office Action Issued in U.S. Appl. No. 16/917,355, dated Oct. 1, 2021, 13 pages.
Non-Final Office Action Issued in U.S. Appl. No. 16/553,943, dated Sep. 1, 2021, 13 pages.
Non-Final Office Action Issued in U.S. Appl. No. 16/827,701, dated Aug. 17, 2021, 19 pages.
Non-Final Office Action Issued in U.S. Appl. No. 16/866,468, dated Sep. 9, 2021, 24 pages.
Non-Final Office Action Issued in U.S. Appl. No. 16/872,202, dated Sep. 24, 2021, 24 pages.
Hensler, J. , et al., "Hybrid Face Recognition Based on Real-time Multi-camera Stereo-Matching", ICIAP: International Conference on Image Analysis and Processing, 17th International Conference, Naples, Italy, Sep. 9-13, 2013, 10 pages.
Scott, Von Duhn , et al., "Three-View Surveillance Video Based Face Modeling for Recognition", Biometrics Symposium, 2007, IEEE, PI, Sep. 30, 2007, 6 pages XP031202430.

* cited by examiner

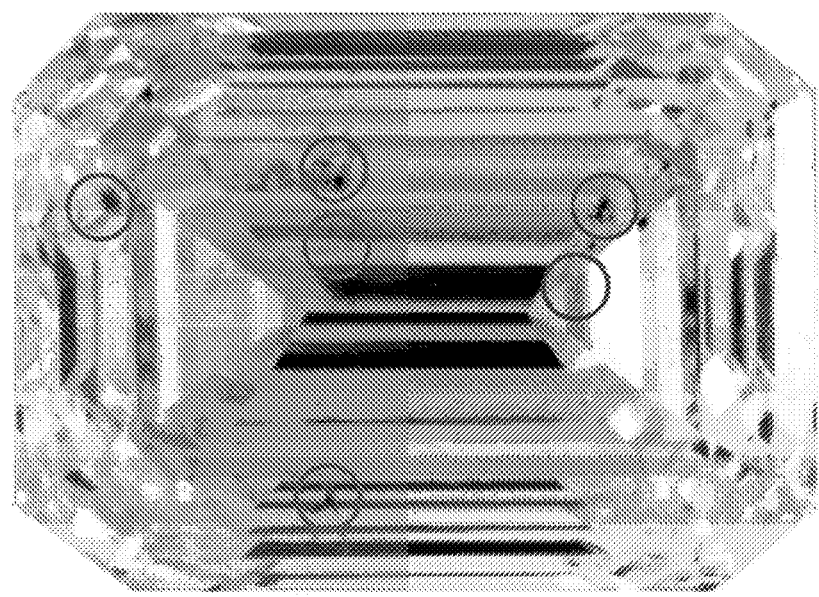
Inclusions in a Diamond FIG. 5

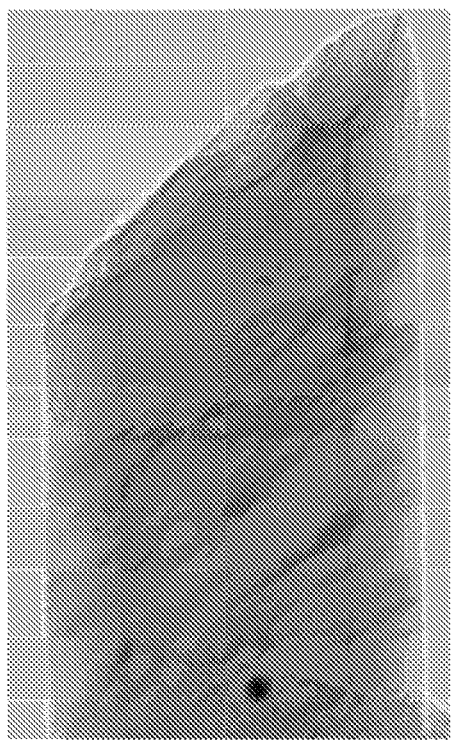
Low-X-Ray Density Regions in a diamond FIG. 6

DEPTH-BASED DIGITAL FINGERPRINTING

COPYRIGHT NOTICE

© Alitheon, Inc. 2018-2021. A portion of the disclosure of this patent document contains material which is subject to copyright protection. The copyright owner has no objection to the facsimile reproduction by anyone of the patent document or the patent disclosure, as it appears in the Patent and Trademark Office patent file or records, if and when they are made public, but otherwise reserves all copyright rights whatsoever. 37 CFR § 1.71(d).

FIELD OF THE INVENTION

This disclosure relates to "digital fingerprinting" of physical objects for identification, authentication, tracking, grading and other applications. More specifically, this disclosure pertains to methods for creating digital fingerprints responsive to or representative of interior features of physical objects including malleable objects.

BACKGROUND OF THE INVENTION

Many different approaches are known to uniquely identify and authenticate physical objects, including labeling and tagging strategies using serial numbers, barcodes, holographic labels, RFID tags, and hidden patterns using security inks or special fibers. Currently known methods commonly rely on applied identifiers that are extrinsic to the object and, as such, may fail to detect introduction of counterfeit or otherwise unknown objects. In addition, many applied identifiers add substantial costs to the production and handling of the objects sought to be identified or authenticated. Applied identifiers, such as labels and tags, are also at themselves at risk of being damaged, lost, stolen, duplicated, or otherwise counterfeited.

The applicant Alitheon, Inc. has disclosed in various patents and other publications novel digital fingerprinting methods and apparatus which overcome the limitations of extrinsic identifiers applied to physical objects and provide other advantages. The previously disclosed technology, among other things, generates, processes and utilizes data (including digital fingerprints) that is uniquely indicative of the surface or a region of the surface of a rigid physical object, and can adapt to accommodate wear and tear on that surface. Such techniques are described in detail below in the Appendix.

BRIEF SUMMARY OF THE DISCLOSURE

The following is a summary of the present disclosure in order to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

It is often possible to obtain information on the internal composition and structure of an item. Previous digital fingerprinting approaches employed by the Applicant aim to characterize one or more surface regions of an object. A summary of surface-based digital fingerprinting and model-based digital fingerprinting is set forth below in the Appendix. The need remains to extend digital fingerprinting to capturing data indicative of the insides of objects. But if we can obtain internal structural information that helps discriminate an object from a similar object or to otherwise characterize the object, we would like to be able to use that internal structural information as part of the digital fingerprint. Such a process is described in this disclosure. Digital fingerprinting that represents interior features, in addition to or in lieu of exterior features, has many advantages, as further described below.

Many currently known or easily imagined approaches for gathering data on the internal structure of an object are available or could be. These include X-ray and optical crystallography, tomography, and standard X-ray data acquisition. All such methods (as well as any other method of gathering 3D location, strength, and characterization data on points of interest) are in view in this patent. Many of these data-gathering methods are quite well known in the art. The novel teachings of this disclosure include, without limitation, the use of that data to create digital fingerprints that include information of the interior of objects.

In some embodiments, the present disclosure enables generating and exploiting digital fingerprints that include data indicative of the inside (or interior features or structures) of an object. The physical object may be rigid or malleable. The digital fingerprints may also include data indicative of features on an exterior surface of the object. The technology disclosed is advantageously relatively invariant to changes in scale, rotation, affine, homography, perspective, and illumination as between a reference digital fingerprint and a later acquired or generated digital fingerprint of the same object.

This disclosure extends both current 2D digital fingerprinting and model-based 3D digital fingerprinting. Both technologies are described in detail below. The new depth-based technology resembles the former (2D digital fingerprinting) because characteristics of the object, now in depth, are processed to produce points of interest and their characterizations. The assemblage of these points, now with 3D rather than 2D location parameters, are aggregated to form the digital fingerprint of the item.

The material of this depth-based technology has features in common with the model-based fingerprinting in that one can (but need not necessarily) build a full 3D model of the object. In the depth-based case, the 3D model includes the inside (or interior portion) of the object, and not merely its surface. One can then digitally fingerprint the 3D model (as described below in the context of surface modeling). Again, this new model does not merely represent the surface of the object, but also at least some interior features.

A digital fingerprinting method may be summarized as including acquiring first image data of an interior portion of a first physical object; extracting a characterizing first digital fingerprint based at least in part on the first image data; and inducting the first physical object into a reference database system by storing a record in the reference database system that includes the first digital fingerprint. The digital fingerprint uniquely identifies the physical object from other physical objects of a same type or class of physical objects as the first physical object based on intrinsic characteristics of the first physical object, without relying on any tag, label, or other extrinsic identifier added to it for identification.

The method may further include scanning a second physical object to capture second image data of an interior portion of the second physical object; extracting a second digital fingerprint based at least in part on the second image data; comparing the second digital fingerprint to the characterizing first digital fingerprint to attempt to authenticate the second physical object as being the first physical object; and generating a report based on the comparison.

The method may include creating a three-dimensional map of the interior portion of the first physical object; converting the three-dimensional map into a digital representation of the interior portion; generating a digital fingerprint of the first physical object based on the digital representation; and storing the digital fingerprint for at least one of subsequent authentication, tracking, grading, and identification.

The method may include detecting a plurality of points of interest in the interior portion of the first physical object; characterizing each point of interest by a respective feature vector; and augmenting each feature vector with at least one of three-dimensional coordinates of the respective point of interest.

The method may include identifying a plurality of points of interest on the portion of the surface of the first physical object; and producing an n-dimensional model of the first physical object, wherein each of the identified plurality of points of interest is characterized by an n-dimensional vector. The n-dimensional vector may be associated with a plurality of parameters including at least one of: an (x, y, z) location of the corresponding identified point of interest on the portion of the surface of the first physical object, a surface shape characteristic, chroma, and reflectance.

BRIEF DESCRIPTION OF THE SEVERAL VIEWS OF THE DRAWINGS

In order to describe the manner in which the above-recited and other advantages and features of the present disclosure can be obtained, a more particular description follows by reference to specific embodiments thereof which are illustrated in the appended drawings. Understanding that these drawings depict only typical embodiments of the disclosure and are not, therefore, to be considered limiting of its scope, the disclosure will be described and explained with additional specificity and detail through the use of the accompanying drawings in which:

FIG. 5 is an image identifying inclusions in a diamond.

FIG. 6 is an image of Low-X-Ray Density Regions in a diamond.

DETAILED DESCRIPTION

Figure 1:
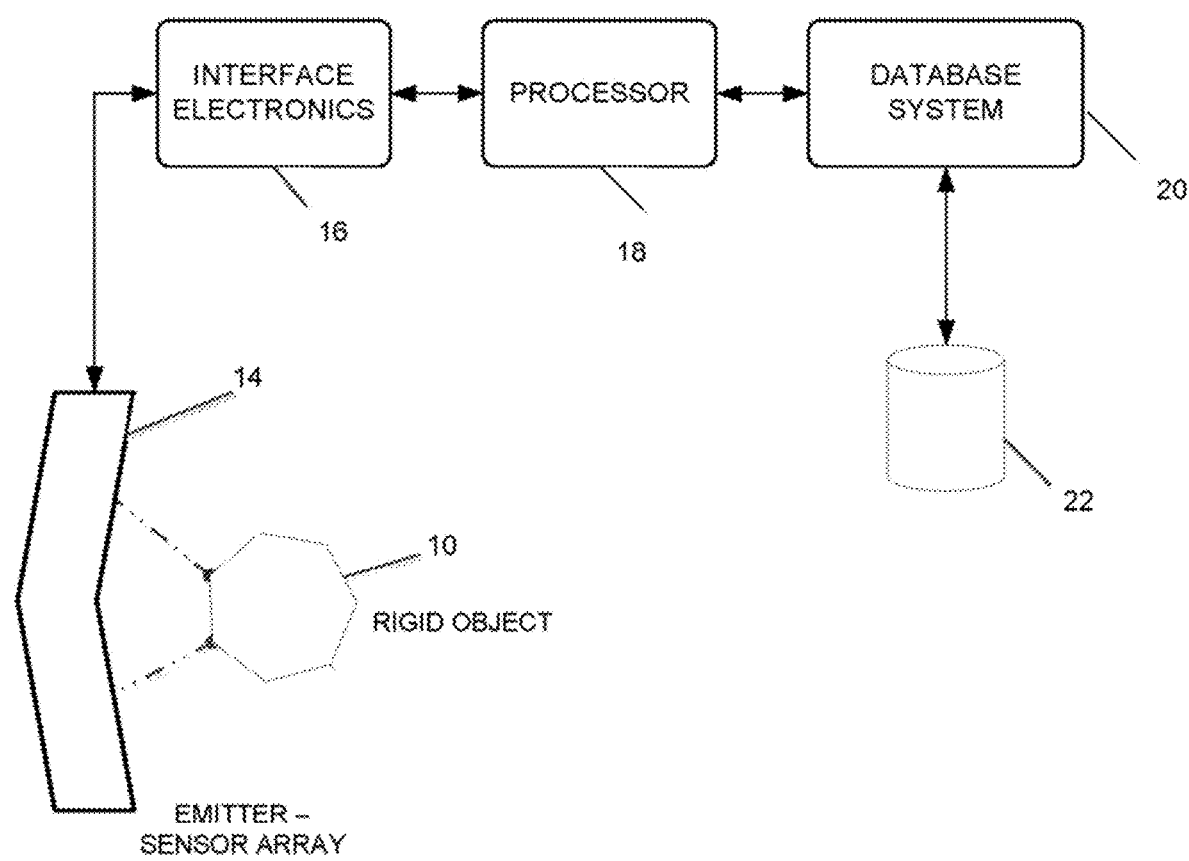
FIG. 1 is a simplified diagram of a system for capturing an image of a rigid object and generating a digital fingerprint of the object.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc., may be used herein to describe various elements, these elements should not be limited by these terms. These terms are only used to distinguish one element from another. For example, a first machine could be termed a second machine, and, similarly, a second machine could be termed a first machine, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purposes of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This disclosure is to extend digital fingerprinting to capturing data indicative of the insides or interior structure or interior features of objects. This object should be at least partially transparent to whatever form of energy and/or equipment is employed to extract or sample the interior structure or features, i.e., the capture device, e.g., sensor or transducer. The capture mechanism can involve visible light, infrared, microwaves, X-rays, sonar, MM, or any other form of energy that can provide an indication or representation of the structure inside an object. Using both surface and internal digital fingerprinting is also in view in this discussion. For example, a single digital fingerprint of an object may represent both the external surface and the internal structure or features. Alternatively, a first digital fingerprint of the object may represent the external surface of the object while a second digital fingerprint of the object may represent the internal structure or features of the object, both the first and the second digital fingerprints used to uniquely identify the object.

In some embodiments, the technology discussed here would capture or sample interior structures or features all the way through an object to identify or capture representations of interior structures or features within the object. However, any method of gathering information on the interior structure or features below the exterior surface, digitally fingerprinting the internal structure, and using that resulting digital fingerprint for any purpose is in view here. Thus, for example, projection-based imaging (such as shining light through a translucent object or using X-rays to produce a flat image that is a projection along an axis is in view). Also, in view are capabilities that can see only partially (e.g., a slight distance) below the exterior surface of the object-infrared display of vein structure and the microwave scanning used for airport screening at TSA are both examples of capture techniques in view in these teachings.

This description is not limited to any particular methods of gathering data on the inside of the object, finding points of interest, characterizing points of interest, and accessing a reference database. Any adequate methods will suffice and are in view here. Similarly, though much of this disclosure uses the terms "image" or "light" for ease of explanation, any method or forms of energy (e.g., electromagnetic, whether non-ionizing or ionizing; sonic whether audible to humans or not; sonar) of sampling or acquiring the data representing internal structure is in view, including all the electromagnetic spectrum, sound, and magnetic resonance imaging.

Once a digital fingerprint representing internal or interior structures or feature (e.g., depth-based digital fingerprint) is extracted, the digital fingerprint can be used to identify the object, grade the item, determine whether there have been changes to the object, and, if so, what those change are, and many other purposes. In other words, depth-based digital fingerprints can be used for everything 2D and 3D surface digital fingerprints can be used for, as well as being able to characterize the internal structures of objects.

Further, although this filing discusses finding things like inclusions, occlusions, or crystal imperfections inside a crystal, the various embodiments of the invention extend to any and all collectable data whose 3D location and/or strength can be determined and turned into a point of interest for characterization. Thus, for example, the X-ray diffraction patterns currently used for gem identification can, if sufficiently localizable (i.e., done with small enough wavelength X-rays), be used as acceptable inputs to a digital fingerprint of the object. As with X-ray diffraction, the information gathered on the internal structure of an object need not be understandable by a human and need not look like an image of the inside. Information gathered, for example, in the bomb detectors used at airports is in a helical scan that is not directly comprehensible to a human and yet provides detailed structural and content information on an object that can be used for digital fingerprinting.

One aspect of the present disclosure is the creation of digital fingerprints from characteristics of internal features of objects. Unlike the Model-based Digital Fingerprinting described below, here the digital fingerprint includes characterizations of points that are internal to an exterior surface of the object, while in previous disclosures the digital fingerprints are all based on the exterior surface of the object with no representation of the interior structure or features. Another point of departure is that the model-based process described below is centered around using photons or other probes to determine the (more or less) invariant properties of an object (the "model"). The present disclosure, in one aspect, is aimed at determining information about the internal structure of an object and using that information to characterize that internal structure for use in a digital fingerprint. The teachings of this patent apply whether or not a model is constructed, though constructing a 3D model of an object (including its internal structures) for more invariant digital fingerprinting (as in the Model-Based patent) is also in view in this disclosure.

Definition of internal. What "internal" means is open to some debate. Surfaces of real-world objects are both naturally three-dimensional and have some depth-based transparency to them. Such is not in view for present purposes. The dividing line can, more or less, be drawn where at least some of the points of interest are the result of what is happening far enough "inside" the object so as to require light (or other probes) to pass through part of the object rather than just reflecting or scattering from its surface. That is how internal is defined for this disclosure and the accompanying claims.

Projective Approach. Methods to capture the internal information from which points of interest are derived fall into two broad categories. The first, which may be called the "projective" approach, works on items that are sufficiently translucent to the particular form of energy employed, for instance electromagnetic energy (e.g., light, X-rays), sound or whatever probe is employed, to enable internal data to be collected all the way through the object. In such objects, light can be transmitted through the object to form one or more flat images and those images can then be processed to find points of interest whose characterizations aggregate to form a digital fingerprint. Applicant has demonstrated this capability by transmitting light through dollar bills, finding points of interest in the resulting "flat" images, and showing that the confidence of match when done so is considerably higher than any matching done on surface information alone. In this case, it is the clumping of paper fibers inside the bill that attenuates the transmitted light and becomes the unique features that are captured in the digital fingerprint.

Figure 9:
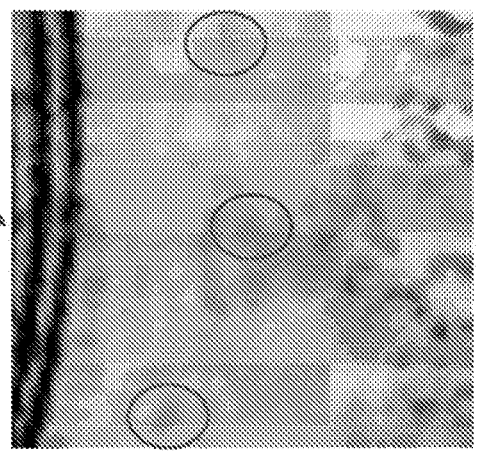
FIG. 9 is an image that illustrates three points of interest; namely, clumps of paper fibers, identified in the image of FIG. 8.

This is probably the simplest way to collect some information on the internal structure of an object. As one illustration, in the drawings, FIG. 9 shows the results of projecting light through a section of a $20 bill. Ink from both sides are clearly seen, but more relevant for this disclosure is the clumping of the paper fibers shown in FIG. 10. Each point in the resultant image is an integration of the opacity of the object along the projection line.

Important to note in this example is that this projective approach is in view in the teachings herein despite the fact that while the projective approach gets information on the internal structure of the object, it does not supply the third dimensional coordinate of that information. While, in some embodiments, this disclosure uses that third dimension, finding or using it is not required to fall in the purview of this patent's teachings. It is merely required that the data used for forming the digital fingerprint come from "inside" the object.

This projective approach is not restricted to "thin" objects. An X-ray of the object (including, say, a person) of sufficient power to capture internal details on a film or digital capture device offers the same potential, even if that information is purely a "shadow-like" projection.

Full Depth Approach. The second approach, which may be called the "full depth" approach, differs from the projective approach in that some information becomes known about the internal 3D location of the points of interest. As will be clear from the discussion below, concerning ways to gather such information, there is a continuum between the projective and full depth approaches, all of which are in view in the teachings of this disclosure. In short, there may be no boundary between them and the two approaches are discussed separately merely as an aid to understanding.

For essentially transparent items with relatively widely separated occlusions (for example, internal imperfections in a gemstone), a stereo imaging approach (or equivalent) can determine the 3D location of the object's imperfections (e.g., internal structures or features) and then a point of interest characterization approach used to characterize those imperfections for inclusion in the digital fingerprint. In terms of the resulting characterization of the point of interest, this is identical to what is proposed in the "Model-based Digital Fingerprinting" described below. But it differs strongly from that approach in other significant ways, primarily in that the point of interest may well come from inside the object, while in the model-based approach it comes from the surface. With that distinction (and the other ones made earlier), much of what is in the model-based patent is applicable here and the depth-based teachings of this disclosure can be used in building a model for digital fingerprinting.

The internal structure of the object of interest is important to this discussion, but exactly what properties of that structure are digitally fingerprinted is not relevant to the teachings of this disclosure. The projective case, for example, produces a simple projection of the internal structure onto a 2D plane and then digitally fingerprints that "shadow." In another example, an explosives scanner may determine that the inside of an object has the signature of a dangerous compound. That signature, without being visible at all, can be digitally fingerprinted and used in the teachings of this disclosure.

As noted, the current process does not necessarily require determining any of the 3-space coordinates of a point of interest. There may be properties of a chemical signature, for example, that could be characterized in many non-spatial dimensional coordinates. Thus, in some cases, we may not be dealing with physical locations at all in a digital fingerprint, even if that digital fingerprint characterizes "dimensional" information—those "dimensions" may be in some arbitrary feature space and their use, provided those dimensions came from inside the object, is still in view in this disclosure. A projection, for example, provides information about the internal structures of the object without providing depth information on where those structures occur.

For a translucent "thick" object, projections can be gathered from multiple angles and the results digitally fingerprinted and the point of interest characterizations aggregated into a digital fingerprint of the entire object. Tomography provides "images" gathered from multiple angles in a variant of this method. Going a bit further, tomography also uses such projections to calculate the 3D location of the internal characteristics. Using the location and intensity of that information as point of interest data for characterizing is also in view in this disclosure. Focus stacking, with or without confocal imaging, can also give good views of mostly transparent objects.

One important variation of the "full depth" approach may be the image-based sequential slicing of the object that is the result of computerized tomography (CAT) scans. Confocal mapping also works in this manner. Multiple slices of the object are obtained at different depths. Point of interest characterizations in each such plane can be aggregated to form the overall digital fingerprint, with the plane's geometry providing the "depth" location information.

Even more complex scans, such as the spiral scans sometimes used (e.g., on bomb detectors at airports), are possible ways of gathering the data that represents internal structure of an object. It is not necessary for this disclosure that a person be able to visualize or even understand the gathered data. It only matters that a second acquisition of the same object produce similar enough results to allow matching of the resulting digital fingerprints (and rejection of not-before-seen objects).

To help visualize the teachings of this disclosure, various examples are provided. It should be understood that these examples are given merely for illustrative purposes and are not meant to limit the teachings of this disclosure and appended claims in any way. The present disclosure is also applicable malleable objects (e.g., the inside of a person). Matching of digital fingerprints may then be done by allowing three-dimensional "rubber sheet" distortions.

Potential Objects of Interest

The teachings of this patent can be used on any object that is at least partially transparent to some form of energy (e.g., electromagnetic radiation of short enough wavelength; ultrasound) to enable capture of characterizing features within the object with adequate resolution. The following examples are not meant to be limiting but rather to provide indications of the breadth of use of the teachings. Some of the examples given here are elaborated in more detail below.

Gemstones (X-ray diffraction, optical scanning)
Human or animal bodies (X-rays, CAT scans, Tomography)
Suitcases and parcels (X-rays, CAT scans, Tomography)
Assembled machinery and composite parts (X-rays, swarm bots)
Shipping containers (X-rays)
Any 3D object (Various)

Gemstone Examples of Use Cases

FIG. 5 is an image identifying inclusions in a diamond.
FIG. 6 is an image of Low-X-Ray Density Regions in a diamond.

The use of the gemstone example is not meant to be limiting and many of the approaches discussed in this context are applicable to other uses of the teachings of this patent.

Gem identification. In one embodiment this disclosure teaches how to identify a gemstone by its imperfections. Virtually all gemstones have natural imperfections within them. Consider a cut diamond and using its internal imperfections to characterize the stone for later identification. One way to capture that information is to look into the gem with two or more imagers and form a stereo image containing the imperfections. From the stereo images, depth information about the locations of the imperfections may be calculated or determined, as well as the characterizing vectors of the resulting points of interest. The depth information and the optical properties of the imperfections can be used to find and characterized the internal structures of the gemstone. Later capture of more or less the same information can be used to create a second digital fingerprint, and comparisons between the first and second digital fingerprints performed to authenticate the second instance or presentation of the gemstone as being the same gemstone as sampled in the first instance or presentation of the gemstone.

Gems, like some artwork and collector-grade coins, cannot be marked for identification without lowering or destroying their value. Digital fingerprinting as taught in this patent offers a way to directly identify transparent or semi-transparent objects without the use of a proxy and without marking the object in any way. This is conceptually similar to what is currently described by the Applicant's previously filed patent applications with surface digital fingerprints, also described below, but provides more information for better discrimination and works on inherently 3-dimensional objects.

Gem grading. Since the information extracted in finding and characterizing internal points of interest may involve the gem's crystal structure, color, clarity, and (most important) imperfections, the information that goes into creating the digital fingerprint can also be used to allow grading of the gemstone. The depth-based digital fingerprints are collected along with grading information from experts and a machine learning system (e.g., a deep neural network) is trained with that information to take the digital fingerprint information as inputs and output the grading information about the gem. Grading information (as well as the depth-based digital fingerprinting information from which it was derived) can also become part of the digital fingerprint of the stone, so the two uses of the internal information are not completely disjoint.

Gem tracking. When a raw gemstone is discovered, the raw gemstone can be digitally fingerprinted. Then, using the technology behind nested authentication, the digital fingerprint of the raw gemstone can be logically (e.g., in processor-readable memory or storage media) be associated with one or more digital fingerprints of the pieces cut from the raw stone at an authorized gem cutter. Those pieces inherit the tracking information of the raw stone, as well as the ability to be tracked separately.

Detecting re-cutting of a stolen gem. If a gemstone has had its depth-based digital fingerprint captured and stored, and it is subsequently cut apart, the pieces of the stone will likely still have parts of the points of interest (in this case, caused by imperfections) from the parent that will allow it to be determined to have been cut from the parent. This identification of a divided object applies to many objects that may be divided (including, gruesomely, for forensics of dismemberment).

If an already-cut stone is stolen, the already-cut stone may be further cut into pieces and the individual pieces sold separately. Current techniques such as X-ray diffraction are not well suited to determining that one object was originally an integral part of another object, but the digital fingerprinting described herein is well suited for this task, being able to find parts of an object in the digital fingerprint of the whole object.

Detecting gem re-cutting and identifying the pieces can work as follows. When the stone is initially cut, a depth-based digital fingerprint is created for the resulting gem. This would normally serve as the method to identify the stone. But consider what happens if such a depth-based digitally fingerprinted stone is stolen and then cut into smaller stones. The technology described herein can be designed to count matches positively, but not count missing or mismatching points of interest against an identification. When a stone has been cut out of the center of a larger stone, the points of interest of the larger stone that were located within what is now the smaller stone will still be there and still characterizable. Each of the excised smaller stones will therefore identify as (part of) the original stone, indicating they had once been physically part of it.

With a gem or any object with an index of refraction significantly different from 1.0, the photons used to probe its interior will be bent at the surface. For use for identifying the gemstone, this may not be very important, but if the digital fingerprint is used to establish that a smaller stone has been excised from a (stolen) larger one, it is likely that the digital fingerprints of the smaller stone will be taken from a different angle than they were at the point of known provenance (i.e., when the stone was first cut). If this is the case, it will be necessary to correct the apparent positions of points of interest for the distortions caused by the high index of refraction of gemstones. Methods for doing this are well known in the art.

Figure 7A:
FIG. 7A is an example of looking "inside" a person without X-Rays.

An example of looking "inside" a person without X-Rays. FIG. 7A is an example of looking "inside" a person without X-Rays. Near-Infrared radiation may, for example, be employed. The amount of "penetration" of the imaging can be only a small portion of the depth of the object or it may cover the entire inside of the object. To illustrate, in FIG. 7 we use near-Infrared radiation to show the vein structure of parts of the human body. Although the veins are not very far inside, the veins are generally not visible on the surface (particularly of the palm) and hence are "inside" for the purposes of this disclosure.

Figure 7B:
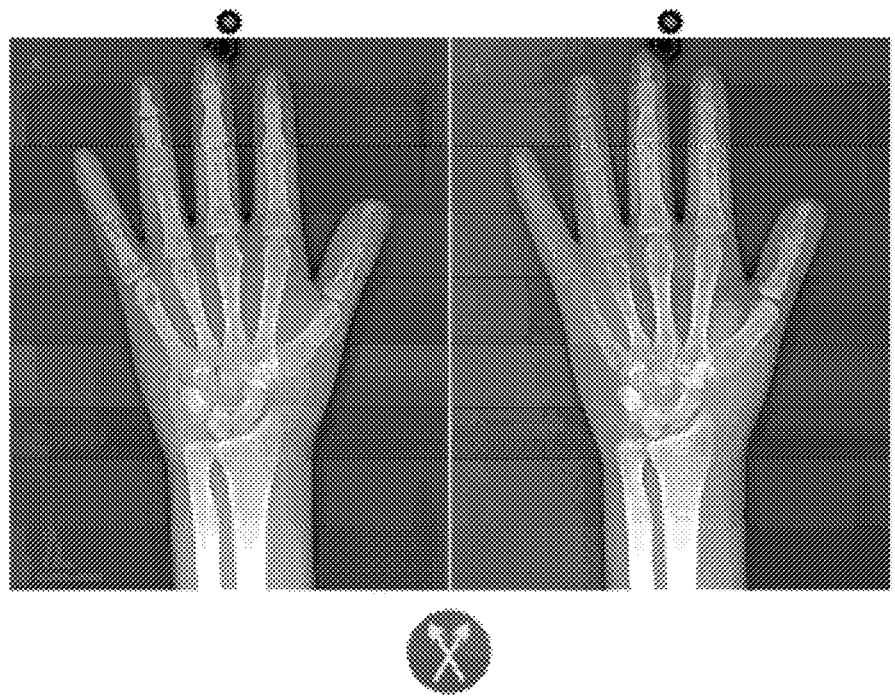
FIG. 7B shows two images taken from slightly different angles.

FIG. 7B shows two images taken from slightly different angles. When viewed cross-eyed (the meaning of the crossing arrows), one can see the three-dimensionality of the wrist structure. The offset must be quite small because no three-dimensionality in the bones themselves is in evidence. This one way to find interior points of interest using stereo X-RAY.

Methods of Capturing the Data

The teachings of this disclosure are generally agnostic to the way data on the internal structure of an object is captured and to the specific way digital fingerprints are extracted (other than preserving their location in 3-space in some useful way). Nonetheless, it is worthwhile to consider some examples of how to collect the data. The following examples are merely illustrative and not intended to limit the scope of the claims unless expressly recited in a claim.

Figure 11:
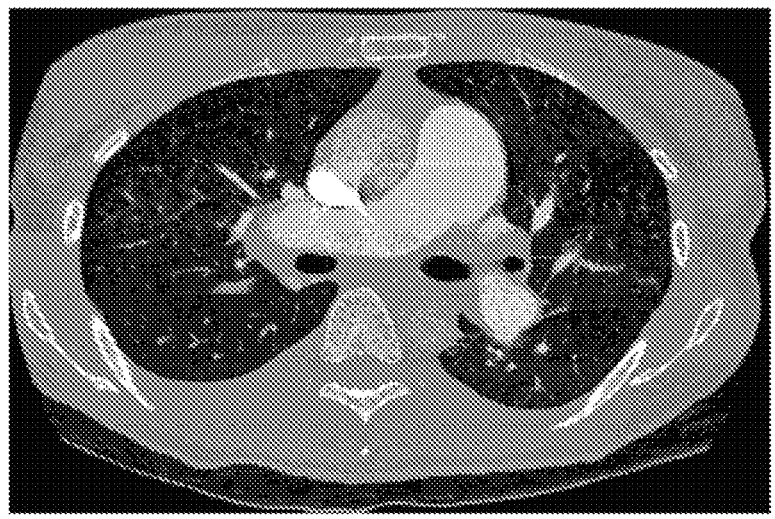
FIG. 11 is a tomographic image of a human pulmonary artery.

Tomography. Tomographic information on the internal structure of an object may be captured by "imaging" sections of the item with any kind of penetrating wave of sufficiently short wavelength to see the relevant features. When we refer to "imaging" in this disclosure, we mean any way of extracting the data. FIG. 11 is a tomographic image of a human pulmonary artery.

Tomography works best where the index of refraction of the object is small, uniform, or well-characterized. Tomography projects a fan of energy (typically X-rays) through the object in a plane section. Many line images are collected from different perspectives. Using inverse Radon transforms (or other methods) the opacity of the object across that section can be calculated. Moving the scanner (or the object) in a direction perpendicular to the fan of energy (e.g., X-rays) results in scanning the third dimension of the object. The result is a mathematical model of the opacity of the object at all points. For the purposes of this disclosure, digital fingerprints may, for example, be extracted from this model.

Confocal scanning microscopy. This approach uses a pinhole to exclude out of focus information as a laser spot scans a three-dimensional volume of the object.

Ultrasound is another method for extracting data responsive to internal structures employing ultrasonic energy.

Figure 8:
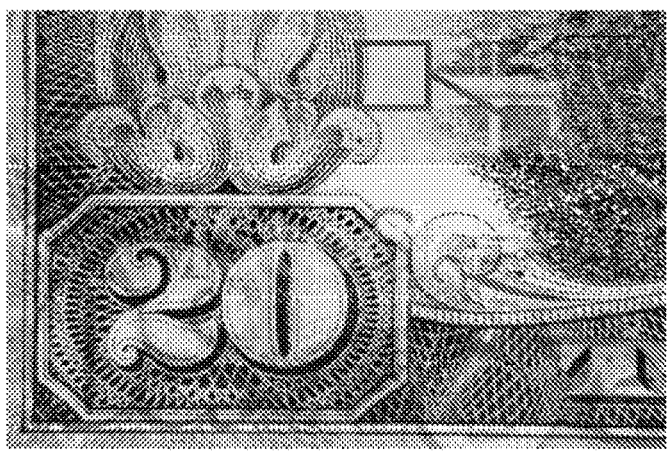
FIG. 8 is an image that illustrates the results of projecting light through a section of a $20 bill.

Projection was discussed above with regard to FIGS. 8-9.

Figure 10:
FIG. 10 is an X-ray image through a piece of luggage.

X-Ray. FIG. 10 shows an X-ray through a piece of luggage. The approaches described herein could be used, for example, to tell whether an item has been added to or removed from a piece of luggage as it goes through, say, an airport.

Focus stacking is another method for extracting data responsive to internal structures.

Appendix: Surface and Model-Based Digital Fingerprinting

A. Surface-Based Digital Fingerprints

The methods described in the present disclosure enable the identification of a physical object from native properties of the physical object without the need for attaching, applying, or associating physical tags or other extrinsic identifying materials with the object. A system does this by creating a unique digital signature for the object, which is referred to as a digital fingerprint. Digital fingerprinting utilizes the structure of the object, including random and/or deliberate features created, for example, during manufacturing or use of the object, to generate a unique digital signature for that object, similar to the way in which a human fingerprint references the friction ridges on a finger. Also, like a human fingerprint, the digital fingerprint can be stored and retrieved to identify objects at a later time. The digital fingerprint can be used to uniquely identify an instance of a physical object. For example, the digital fingerprint uniquely identifies the first physical object from other physical objects of a same type or same class of physical objects as the first physical object, advantageously based on intrinsic characteristics of the first physical object. For surface-based implementations, those intrinsic characteristics may include intrinsic characteristics on an exterior surface of the first physical object, without relying on any tag, label, or other extrinsic identifier added to the first physical object for identification. For interior-based implementations, those intrinsic characteristics may include intrinsic characteristics of the interior portion of the first physical object, without relying on any tag, label, or other extrinsic identifier added to the first physical object for identification. Some implementations may use both interior-based and surface-based intrinsic characteristics.

Eliminating the need to add extrinsic identifiers or any physical modifications to an object offers a number of advantages to manufacturers, distributors, buyers, sellers, users, and owners of goods. Forgoing the addition of extrinsic identifiers reduces the cost of manufacturing and offers greater security than physical tagging. Moreover, physical identifiers can be damaged, lost, modified, stolen, duplicated, or counterfeited whereas digital fingerprints cannot.

Unlike prior approaches that simply utilize a comparison of pixels, a system in accordance with the present disclosure utilizes the extraction of features to identify and authenticate objects. Feature extraction enables users to take a large amount of information and reduce it to a smaller set of data points that can be processed more efficiently. For example, a large digital image that contains tens of thousands of pixels may be reduced to a few locations of interest that can be used to identify an object. This reduced set of data is called a digital fingerprint. The digital fingerprint contains a set of fingerprint features or locations of interest (also termed "points of interest"), which are typically stored as feature vectors. Feature vectors make image processing more efficient and reduce storage requirements as the entire image need not be stored in the database, only the feature vectors need to be stored. Examples of feature extraction algorithms include, but are not limited to, edge detection, corner detection, blob detection, wavelet features, Gabor, gradient and steerable output filter histograms, scale-invariant feature transformation, active contours, shape contexts, and parameterized shapes. While the most common applications of the system may be in the authentication of physical objects such as manufactured goods and documents, the system is designed to be applicable to any object that can be identified, characterized, quality tested, or authenticated with a digital fingerprint. These include but are not limited to mail pieces, parcels, art, coins, currency, precious metals, gems, jewelry, apparel, mechanical parts, consumer goods, integrated circuits, firearms, pharmaceuticals, and food and beverages. Here the term "system" is used in a broad sense, including the methods of the present disclosure as well as apparatus arranged to implement such methods.

Scanning

In this application, the term "scan" is used in the broadest sense, referring to any and all techniques and/or apparatus operable to capture an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or a mechanical wave that has traveled through an object or reflected off an object or any other means to capture the surface or internal structure of an object is a candidate to create a "scan" of an object.

Various means to extract "fingerprints" or features from an object may be used; for example, through sound, physical structure, chemical composition, or many others. The remainder of this application may use terms like "image," but when doing so, the broader uses of this technology should be implied. In other words, alternative means to extract "fingerprints" or features from an object should be considered as equivalents within the scope of this disclosure. Similarly, terms such as "scanner" and "scanning equipment" herein may be used in a broad sense to refer to any equipment capable of carrying out "scans" as defined above, or to equipment that carries out "scans" as defined above as part of their function. Where the present disclosure stipulates particular imaging or scanning methods or equipment, such as an "image" or "camera," such method or equipment may be substituted by other imaging or scanning methods or scanning equipment.

Authenticating

In this application, different forms of the words "authenticate" and "authentication" will be used broadly to describe both authentication and attempts to authenticate which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a database for subsequent reference, the action described as "authentication" or "attempted authentication" may also, post facto, be properly described as an "induction." An authentication of an object may refer to the induction or authentication of an entire object or of a portion of an object. Authentication may, for example, confirm that a subsequent instance or appearance of an object is the same object that was previously digitally fingerprinted, or is not the same object that was previously digitally fingerprinted. In some implementations, authentication may, for example, confirm that a subsequent instance or appearance of an object is a portion of an object that was previously digitally fingerprinted, or is not a portion of the object that was previously digitally fingerprinted.

Authentication Regions

Because digital fingerprinting works with many different types of objects, it may be useful to define what regions of digital images of objects are to be used for the extraction of features for authentication purposes. The chosen regions may vary for different classes of objects. In some embodiments, a chosen region may be the image of the entire object; in other embodiments chosen regions may be one or more sub-regions of the image of the object. For instance, in the case of a photograph, a digital image of the entire photograph may be chosen for feature extraction. Each photograph is different and there may be unique feature information anywhere in a photograph. In such a case, the authentication region may be the entire photograph.

In some embodiments, multiple regions may be used for fingerprinting. In some examples, there may be several regions where significant variations take place among different similar objects that need to be distinguished while, in the same objects, there may be regions of little significance. In other examples, a template may be used to define regions of interest, including elimination of regions of little interest.

In one embodiment, an object, such as a bank note, may be deemed authenticated if a few small arbitrary regions scattered across the surface are fingerprinted, possibly combined with one or more recognitions of, for example, the contents of a region signifying the value of the bank note or one containing the bank note serial number. In such examples, the fingerprints of any region (along with sufficient additional information to determine the bank note value and its purported identity) may be considered sufficient to establish the authenticity of the bill. In some embodiments, multiple fingerprinted regions may be referenced in cases where one or more region may be absent from an object (through, for example, tearing) when, for example, a bank note is presented for authentication.

In other embodiments, however, all regions of an object may need to be authenticated to ensure an object is both authentic and has not been altered. In one embodiment, a passport may provide an example of feature extractions from multiple authentication regions. In the case of a passport, features chosen for authentication may be extracted from regions containing specific identification information such as the passport number, the recipient name, the recipient photo, etc. In some examples, a user may define a feature template specifying the regions whose alteration from the original would invalidate the passport, such as the photo, identifying personal data, or other regions considered important by the user. More details of feature templates are given in Ross et al., U.S. Pat. No. 9,443,298.

In some embodiments, an ability to define and store optimal authentication regions for classes of objects may offer benefits to a user. In some embodiments, it may be preferable to scan limited regions of objects rather than to scan entire objects. For instance, in the case of an article of designer clothing, scanning a clothing label may be preferable to scanning an entire garment. To be more clear, the label or a portion of it is scanned for fingerprinting, not to recognize text or other content on the label. Further, defining such regions may enable detection of partial alteration of an object.

Once an authentication region is defined, specific applications may be created for different markets or classes of objects that may assist users in locating and scanning an optimal authentication region. In some embodiments, for example when utilizing a mobile device, a location box and crosshairs may automatically appear in the viewfinder of a smartphone camera application, to help the user center the camera on an authentication region, and automatically lock onto a region and complete a scan when the device is focused on an appropriate area. It should be noted that, although some examples suggested above are two-dimensional objects (passport, bank note), the present disclosure is fully applicable to three-dimensional objects as well. As previously noted, scanning may be of any kind, including 2-D, 3-D, stereoscopic, HD, etc., and is not limited to the use of visible light or to the use of light at all. As previously noted, sonar and ultrasound are, for example, appropriate scanning technologies.

In some embodiments, objects may have permanent labels or other identifying information attached to them. In addition to the objects themselves, these attachments may also be referenced as features for digital fingerprinting, particularly where the label or other identifying information becomes a permanent part of the object. In one example, a permanent label may be used as an authentication region for the object to which it is affixed. In another example, a label may be used in conjunction with the object itself to create a fingerprint of multiple authentication regions referencing both a label and an object to which the label is affixed.

In one example, wine may be put into a glass bottle and a label affixed to the bottle. Since it is possible that a label may be removed and re-applied elsewhere, merely using the label itself as an authentication region may not be sufficient. In this case, the authentication region may be defined so as to include both a label and a substrate it is attached to in this example some portion of a label and some portion of a glass bottle. This "label and substrate" approach may be useful in defining authentication regions for many types of objects, such as various types of goods and associated packaging. In other instances, authentication may reveal changes in the relative positions of some authentication regions such as in cases where a label has been moved from its original position, which may be an indication of tampering or counterfeiting. If an object has "tamper-proof" packaging, this may also be included in the authentication region.

In some embodiments, multiple authentication regions may be chosen from which to extract unique features. In a preferred embodiment, multiple authentication regions may be selected to enable the separate authentication of one or more components or portions of an object. For example, in one embodiment, features may be extracted from two different parts of a firearm. Both features may match the original firearm but since it is possible that both parts may have been removed from the original firearm and affixed to a weapon of different quality, it may also be useful to determine whether the relative positions of the parts have changed. In other words, it may be helpful to determine that the distance (or other characteristics) between Part A's authentication region and Part B's authentication region remains consistent with the original feature extraction. If the positions of Parts A and B are found to be consistent to the relative locations of the original authentication regions, the firearm may be authenticated. Specifications of this type may be stored with or as part of a digital fingerprint of an object.

Fingerprint Template Definition

In an embodiment, when a new type or class of object is being scanned into a system for the first time, the system can create a fingerprint template that can be used to control subsequent authentication operations for that class of objects. This template may be created either automatically by the system or by a human-assisted process.

A fingerprint template is not required for the system to authenticate an object, as the system can automatically extract features and create a digital fingerprint of an object without a fingerprint template. However, the presence of a template may improve the authentication process and add additional functionality to the system.

Table 1. Example Fingerprint Template.
Class:
[Description of the Object]
United States Passport
Authentication Region:
[Description of the Authentication Regions for the Object]
Region 1: (x1, y1, z1), (x2, y2, z2)
Region n
Region Match List
[List of the Regions that are Required to Match to Identify an Object]
Region List: 1 . . . n
Features:
[Key Features of the Object]
   Feature 1: Passport Number
   Feature 2: Photo
   Feature 3: First Name
   Feature 4: Last Name
Feature n
Methods:
[Programs that can be run on features of an object]
Feature 2:
Photo Method 1: [checkphoto.exe] Check for uneven edges indicating photo substitution
Method n
Feature n
Method n
Additional Data
[Additional Data Associated with the Object]
   Data 1: example data
   Data n The uses of the fingerprint template include but are not limited to determining the regions of interest on an object, the methods of extracting fingerprinting and other information from those regions of interest, and methods for comparing such features at different points in time. The name "fingerprint template" is not limiting; other data with similar functionality and a different name should be considered equivalent.

In an embodiment, four different but related uses for this technology are particularly in view in the present disclosure. These are illustrative but are not intended to be limiting of the scope of the disclosure. These applications may be classified broadly as (1) authentication of a previously scanned original, (2) detection of alteration of a previously scanned original, (3) detection of a counterfeit object without benefit of an original, and (4) assessing the degree to which an object conforms with a predetermined specification, such as a manufacturing specification or other applicable specification.

In example (1), an object is fingerprinted preferably during the creation process, or at any time when its provenance may be sufficiently ascertained, or at a point where an expert has determined its authenticity. Subsequently, the object is later re-fingerprinted, and the two sets of fingerprints are compared to establish authenticity of the object. The fingerprints may be generated by extracting a single fingerprint from the entire object or by extracting multiple sets of features from multiple authentication regions. Fingerprinting may also involve reading or otherwise detecting a name, number, or other identifying characteristics of the object using optical character recognition or other means which may be used to expedite or facilitate a comparison with other fingerprints. For instance, in cases where manufacturing database systems, or other object databases, use serial numbers or other readable identifiers, such identifiers may be utilized to directly access the database record for the object and compare its digital fingerprint to the original that was previously stored, rather than searching an entire digital fingerprinting database for a match.

In case (2), a fingerprinted object is compared, region by region, with a digital fingerprint of an original object to detect low or nonexistent matching of the fingerprint features from those regions. While case (1) is designed to determine whether the original object is now present, case (2) is designed to detect whether the original object has been altered and, if so, how it has been altered. In some embodiments, authentication regions having poor or no matching fingerprint features will be presumed to have been altered.

In case (3), an object may not have been fingerprinted while its provenance was sufficiently ascertainable. One example would be bills or passports created prior to initiating the use of a digital fingerprinting system. In such examples, digital fingerprints of certain regions of interest on an object may be compared with digital fingerprints from known, or suspected, counterfeit objects or with both those and fingerprints of properly authenticated objects. In one example, a photograph may be spuriously added to a passport and, as an artifact of the counterfeiting, the edge of the added photo may tend to be sharper than an edge of an original, unaltered, photograph. In such a case, fingerprint characteristics of known authentic passports and those of passports that are known (or suspected to) have been altered by changing a photograph may be compared with the passport being inspected to estimate whether the passport exhibits indications of alteration.

Digital Fingerprint Generation

In an embodiment, once an object has been scanned and at least one authentication region has been identified, the digital image, which will be used to create the unique digital fingerprint for the object, is generated. The digital image (or set of images) provides the source information for the feature extraction process.

In the present disclosure, a digital fingerprinting feature is defined as a feature or a point (e.g., a location) of interest in an object, which feature is inherent to the object itself (i.e., the feature is included in the native properties of the object). In some embodiments, features preferably are a result of a manufacturing process, other external processes, or of any random, pseudo-random, or deliberate process or force, such as use. To give one example, gemstones have a crystal pattern which provides an identifying feature set. Every gemstone is unique, and every gem stone has a series of random flaws in its crystal structure. This pattern of random flaws may be used for the extraction of feature vectors for identification and authentication.

In the present disclosure, a "feature" is not necessarily concerned with reading or recognizing meaningful content, for example by using methods like optical character recognition. A digital fingerprint of an object may capture both features of the object and features of any identifiers that are affixed or attached to the object. Feature vectors extracted from authentication regions located on an affixed identifier are based on the substances of which the identifier is physically comprised rather than the information (preferably alphanumeric) that is intended to be communicated by the identifier. For instance, in the case of a wine bottle, features may be captured from the bottle and from a label affixed to the bottle. If the label includes a standard UPC bar code, the paper of the label and the ink pattern of the bar code may be used to extract a feature vector without reading the alphanumeric information reflected by the bar code. An identifier, such as a UPC bar code print consisting of lines and numbers, has no greater significance in the generation and use of a feature vector than a set of randomly printed lines and numbers.

Although reading identifier information is not necessary for digital fingerprinting, in some embodiments, where a user desires to capture or store identifier information (such as a name, serial number, or a bar code) in association with an object, the system may allow the user to capture such information and store it in the digital fingerprint. Identifier information may, for example, be read and stored by utilizing techniques such as optical character recognition and may be used to facilitate digital fingerprint comparisons. In some cases, serial numbers may be used as the primary index into a database that may also contain digital fingerprints. There may be practical reasons for referencing serial numbers in relation to digital fingerprints. In one example, a user is seeking to determine whether a bank note is a match with a particular original. In this case, the user may be able to expedite the comparison by referencing the bank note serial number as an index into the digital fingerprinting database rather than iterating through a large quantity of fingerprints. In these types of cases, the index recognition may speed up the comparison process, but it is not essential to it.

Once a suitable digital fingerprint of an object is generated, the digital fingerprint may be stored or registered in a database. For example, in some embodiments, the digital fingerprint may comprise one or more fingerprint features which are stored as feature vectors. The database should preferably be secure. In some embodiments, a unique identifier, such as a serial number, may also be assigned to an object to serve, for example, as a convenient index. However, assigning a unique identifier is not essential as a digital fingerprint may itself serve as a key for searching a database independent of any addition of a unique identifier. In other words, since a digital fingerprint of an object identifies the object by the unique features and characteristics of the object itself the digital fingerprint renders unnecessary the use of arbitrary identifiers such as serial numbers or other labels and tags, etc.

In an embodiment, an object is scanned and an image is generated. The acts that follow depend on the operation to be performed. Several illustrative example cases are discussed below.

Case 1: For authentication of a previously fingerprinted object, the following acts may be followed:
1. One or more authentication regions are determined, such as automatically by a system, or by utilizing the authentication region definitions stored in a fingerprint template.
2. Relevant features are extracted from each authentication region and a digital fingerprint is generated. Feature extractions preferably will be in the form of feature vectors, but other data structures may be used, as appropriate.
3. Optionally, other information, for example a unique identifier such as a serial number, may be extracted and stored to augment subsequent search and identification functions.
4. The digital fingerprint of the object to be authenticated is compared to digital fingerprints stored in a database.
5. The system reports whether (or to what extent) the object matches one or more of the digital fingerprints stored in the database.
6. The system may store the digital fingerprint of the object to be authenticated in the database along with the results of the authentication process. Preferably, only the extracted features will be stored in the database, but the authentication image and/or the original image and/or other data and metadata may be stored in the database, for example for archival or audit purposes.

Case 2: For inspection of specific features of a previously fingerprinted object to determine whether they have been altered, the acts are similar to Case 1, but the process is aimed at detection of alterations rather than authentication of the object:
1. One or more authentication regions are determined, such as automatically by the system, or by utilizing the authentication region definitions stored in a fingerprint template.
2. The features to be inspected are extracted from an authentication region and the digital fingerprint is generated. The features extracted may be in the form of feature vectors for the features to be inspected but other data structures may be used, as appropriate.
3. Optionally, other information, for example a unique identifier such as a serial number may be extracted and stored to be used to augment subsequent search and identification functions.
4. The digital fingerprint of features to be inspected for alteration is compared to the fingerprint of the corresponding features from the original object stored in the database.
5. The system reports whether the object has been altered; i.e., the extent to which the digital fingerprint of the features to be inspected matches those previously stored in the database from the original object, in whole or in part.
6. The system may store the digital fingerprint of the features to be inspected in the database along with the results of the inspection process. Preferably, only the features will be stored in the database, but the authentication image and/or the original image and/or other data and metadata may be stored in the database for archival or audit purposes.

In the above cases, and in cases elaborated on in related applications, features may be extracted from images of objects scanned under variable conditions, such as different lighting conditions. Therefore, it is unlikely two different scans will produce completely identical digital fingerprints. In a preferred embodiment, the system is arranged to look up and match objects in the database when there is a "near miss." For example, two feature vectors [0, 1, 5, 5, 6, 8] and [0, 1, 6, 5, 6, 8] are not identical, but by applying an appropriate difference metric, the system can determine that they are close enough to say with a degree of certainty that they are from the same object that has been seen before. One example would be to calculate the Euclidean distance between the two vectors in multi-dimensional space and compare the result to a threshold value. This is similar to the analysis of human fingerprints. Each fingerprint taken is slightly different, but the identification of key features allows a statistical match with a high degree of certainty, even in cases where the target object may have changed from, for example, wear and tear.

Fingerprint feature extraction is applied to locations of interest. The results for each location may be stored as fingerprint feature vectors. To clarify, a "location of interest" (often referred to as a "point" or "area" of interest) may well be a physical feature on the object, but the "feature vector" that characterizes that location of interest is not just a variation on the image around that location; rather, the feature vector is derived from it by any of a number of possible means. Preferably, a feature vector may be an array of numeric values. As such, feature vectors lend themselves to comparison and other analyses in a database system. A collection of feature vectors may be stored as a feature vector array.

The stored features (from the original object) are compared with the features extracted from the new object. As in this case, if the locations of interest are not encountered in the second object, or of the feature vectors characterizing those locations of interest are too different, there is no match (or a low confidence level for a match) for that location of interest. Variables, such as which locations must match and/or how many locations must match and/or the degree of matching required to conclude that an object matches the one previously fingerprinted, may in some embodiments be specified in a digital fingerprint record, further described below, or in some other associated record, to guide the decision process. This arrangement may be advantageous, for example, for exporting a database to a generic processor or system for remote authentication work. The matching logic may be embedded in the digital fingerprint record. Preferably, the matching logic is implemented in software as part of an authentication system.

One advantage of the feature-based method is that when an object is worn from handling or use (even very worn), a system may still identify the object as original, which may be impossible with the bitmapped approach. In addition to being able to recognize a worn object, the feature-based approach is able to address other external problems such as rotated images. This is especially beneficial in a system where an unsophisticated user, such as a retail customer, may be scanning an object to be authenticated. In such cases, external factors like lighting and rotation may not be under the system operator's control.

Further matching may be done to increase the level of confidence of the match, if desired. In some embodiments, a number of matches on the order of tens or hundreds of match points may be considered sufficient. The number of non-match points also should be taken into account. That number should preferably be relatively low, but it may be non-zero due to random dirt, system "noise," and other circumstances. Preferably, the allowed mapping or transformation should be restricted depending on the type of object under inspection. For instance, some objects may be rigid or inflexible, which may restrict the possible deformations of the object.

Summarizing the imaging requirements for a typical fingerprinting system, for example for inspecting documents, the system preferably should provide sufficient imaging capability to show invariant features. Particulars will depend on the regions used for authentication. For many applications, 10-fold magnification may be adequate. For ink bleeds on passports, bills, and other high-value authentication, 40-fold magnification may likely be sufficient. In preferred embodiments, the software should implement a flexible response to accommodate misalignment (rotation), misorientation, and scale changes. Color imaging and analysis is generally not required for using the processes described above but may be used in some cases.

B. Model-Based Digital Fingerprints

This technology captures sufficient information to create an invariant model of the object and then extract a characterizing digital fingerprint of the object from that model (rather than from any image of the object). This approach removes the need for the point of interest characterizations to contain the invariances and instead makes use of the invariance of the object itself. To be clear, characterizing a rigid object in such a manner that its surface features (including chroma and reflectivity) become part of a known model of the object and then extracting the digital fingerprint from that model means that the resulting point-of-interest feature vector surface feature characterizations do not need to throw away discriminating information to achieve invariance and hence that no such information is lost in creating the fingerprint.

Once a model is created, it is possible after the fact to calculate what the object would look like from any angle and under any form of illumination. Then, any desired "standard angle" and "standard illumination" could be applied, the digital fingerprint calculated, and the result compared with other fingerprints taken under or calculated from those conditions. What is taught here encompasses any attempts to "recalculate" the image prior to extracting the digital fingerprint, but goes considerably further. What is taught here is that a digital fingerprint may be extracted not only from any computed image of the object but more importantly, from the model's characteristics (which, by definition, are properties of the object and not of the lighting or imaging). These two teachings (back-calculating the effect of some canonical lighting and then extracting the fingerprint and calculating the fingerprint from the model rather than from an image) are both important and are related, but they are distinct. In the teachings of this disclosure, the model is created using one or more images of the object, so imaging the object well remains important. But in this teaching the images are akin to "probes" to find out characteristics of the surface itself and build a model of that surface from that information. Once the model is built, the digital fingerprint may be extracted from it.

Using any more-or-less invariant model of a rigid object to extract a digital fingerprint (either from the model or from any recalculated illumination of the model) falls within the purview of this description. To be useful, such a model would need to contain at least enough information to achieve the desired invariances and to distinguish it from similar object.

A process, in one embodiment, comprises the following: to build a model, multiple images of the object are captured. These images in some sense cover the range of images that might later be collected of the object at identification/ authentication/tracking. These images cover the range but need not "fill in all the gaps." In other words, the purpose of the different images is to act as "probes" of the surface to detect invariant things about it. This can be done without taking every possible image of the object.

From those images a model is constructed (for monochrome captured images, that surface model may just show the gray scale of the surface and hence not require the images be taken in different colored light. For color captured images, it might show the chroma of the surface as well). The model may be of an exterior surface of the object, an interior of the object, and/or the exterior surface and interior of the object.

An important aspect of the model-based approach is to use the imaging solely to gather data on the actual properties of the object, and then extract the digital fingerprint from the model (that has the actual properties of the object so far as is determinable from the different images collected), rather than from the images.

Figure 2A:
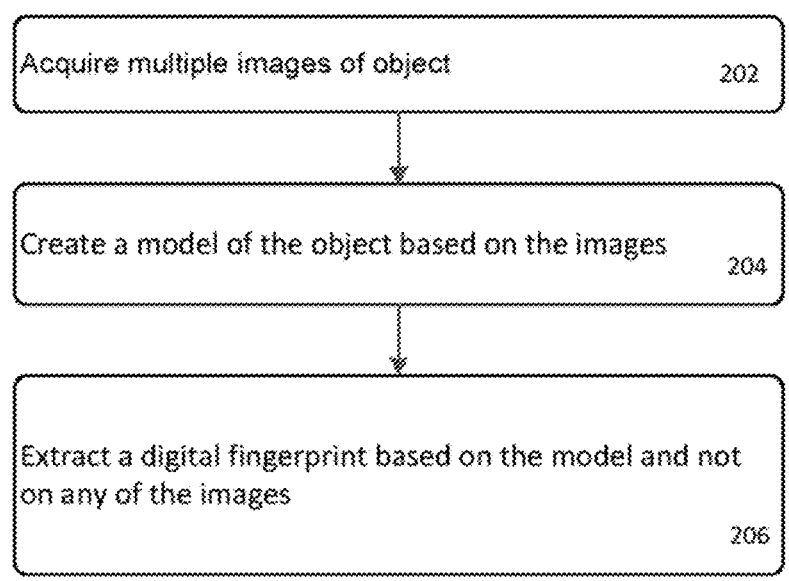
FIG. 2A is a simplified flow diagram of a process for generating model-based digital fingerprints.

FIG. 2A is a simplified flow diagram of such a process at a high level. As noted, this begins with capturing multiple images of the object, block 202. Then create a model of the object based in the images, block 204. Finally, extract a digital fingerprint based on the model and not on any of the images, block 206.

A brief illustration: If I shine red light on an object and the camera responds strongly in the red range, I might conclude that the object is red. But if I then hit it with blue and green light and get the same response, I can only conclude that the actual surface is white, even though we never probed it with white light. This shows one advantage of acquiring multiple image data.

Based on the various images, a model of the object is constructed that may include the 3D shape of the object, its chroma, its reflectance properties, and/or other characteristics. As mentioned above, the model only seeks to be invariant enough to accommodate expected variations in later lighting or positioning variations. The model should provide sufficient discrimination for later identification, tracking, authentication, etc. to an acceptable level of confidence.

A digital fingerprint may be extracted from the characteristics of the model and not from the images directly. Substantially the same model could be constructed from a totally different set of images, provided those images met the characteristics mentioned above of covering the range of expected variations. This digital fingerprint is formed from the model and is more or less independent of the specifics of the lighting conditions under which its input images were taken. The digital fingerprint also is not dependent on any feature added the object for identification, such as a tag or label (although it would be affected by something adhered on to the surface of the object, not because of information content like a bar code symbol, but because the label changes the surface of the object. That digital fingerprint may be stored in a database for later use.

Later on, a second digital fingerprint is extracted of an object to be authenticated. This process may involve creating a second model of the object to be authenticated (for example, an object that is believed to be substantially identical with the originally-created model and hence a second instance or appearance of that first object). Models are considered "complete" when applying additional images (from different angles, of different colors, etc.) do not result in significant changes to the model. Creating the second digital fingerprint may, on the other hand, not involve creating a model, but instead creating the second digital fingerprint from one or more images of the object without the intermediate act of creating the model. In other words, we may end up testing a fingerprint created from a second model of the object OR testing a fingerprint made from one or more images of the object.

Figure 2B:
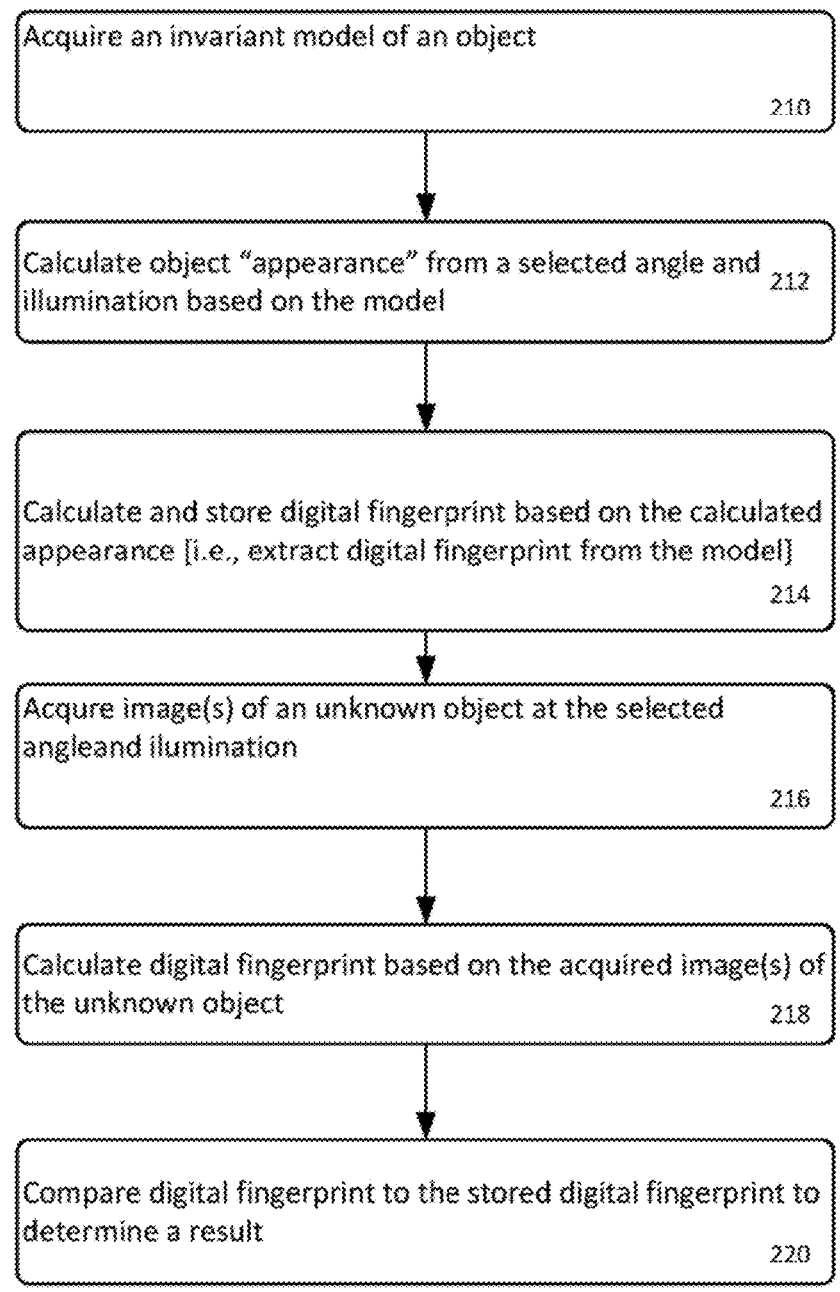
FIG. 2B is a simplified flow diagram of a process for identifying or authenticating an unknown object utilizing model-based digital fingerprint techniques.

FIG. 2B is a simplified flow diagram summarizing such a process for identifying or authenticating an unknown object utilizing model-based digital fingerprint techniques. To begin, we acquire an invariant model of a known object, block 210. Next, calculate the object "appearance" from a selected angle and illumination based on the model, block 212. Next, calculate and store a digital fingerprint based on the calculated appearance, i.e., extract a digital fingerprint from the model, block 214. The process thus far may be referred to as induction of the known object into the database system. Subsequently, acquire image(s) of an unknown object at the selected angle and illumination, block 216. Calculate a digital fingerprint based on the acquired image (s) of the unknown object, block 218. And finally, compare the digital fingerprint of the unknown object to the stored (or "reference") digital fingerprint of the known object, block 220.

Figure 2C:
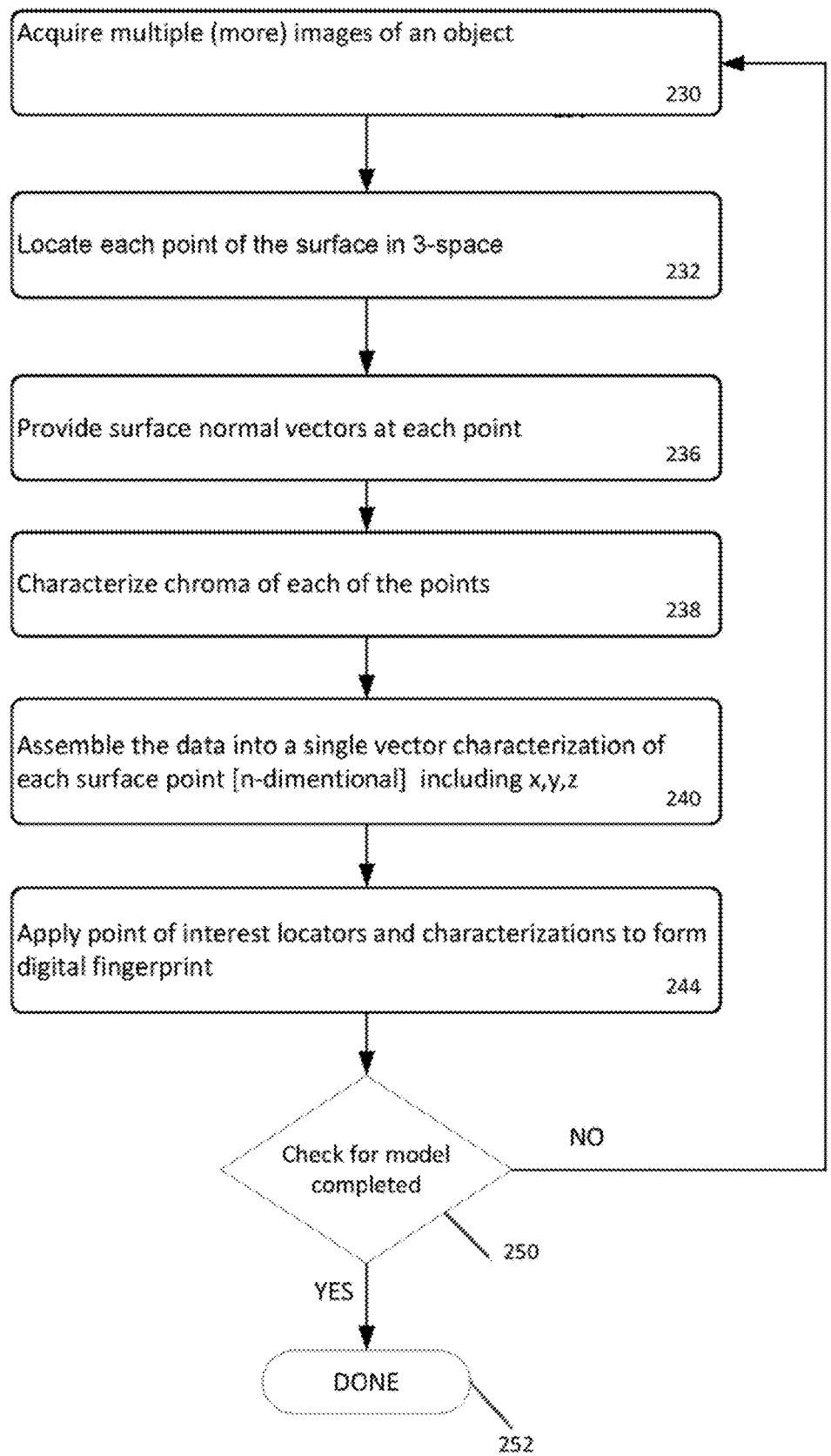
FIG. 2C is a simplified flow diagram of a process for building a model from one or more images of a rigid object and generating a digital fingerprint from the model.

FIG. 2C is a simplified flow diagram of a process for building a model from multiple images of a rigid object and generating a digital fingerprint from the model. To begin, the process calls for acquiring multiple images of an object, block 230. Then locating each point of the object (e.g., exterior surface, interior portion) in 3-space, block 232. Next, providing surface normal vectors at each of the located points, block 236. Next, characterizing chroma, reflectance or density for each of the points, block 238. Then assembling the data into a single vector characterization of each point [n-dimensional] including x,y,z, block 240. Next, applying point of interest locators and characterizations to form a digital fingerprint, block 244. Decision 250 checks for completion of the model, and if it is not complete, the process loops back to block 210 to acquire more images of the object. If the model is done, the process is completed at exit 252. These various acts are described in more detail below.

A 3-D Representation of the Object

In some preferred embodiments, the model that is built at induction must contain the positions (e.g., surface positions, interior positions) of enough of the object to enable a useful digital fingerprint to be extracted. For example, the model must contain enough information to allow discriminating this object from other, similar objects. This need not include the entire exterior surface and/or entire interior of the entire object, but it must be enough so that when the model is reconstructed at authentication, the two models can be compared. Clearly, modeling the entire exterior surface and/or entire interior may make this comparison easiest to do.

The characteristics of the model may be built in a variety of ways. For a 3-D representation, data from structured light, stereo, or other ways to capture 3-D data would be acceptable, for example. Similarly, any point of interest characterization known in the industry or later developed, such as SIFT or SURF, likely provides enough object characterization to allow satisfactory authentication when used in the techniques taught herein. One method is described as an embodiment below.

This 3-D representation of the object has several purposes, some of which will be described as we proceed. One advantage of the present disclosure pertains to the 3-D representation in particular: it is possible by many different means to extract digital fingerprints for later comparison of objects solely from the 3-D model without any reference to any image of the object.

In one example, a 3-D map of the object (exterior surface and/or entire interior) is created or generated through any of various means, including stereo or structured light imaging. Next, convert the depth map into a pseudo-gray-scale representation of the surface. This surface may be "unwrapped" as described below or it may be viewed from a particular direction and distance. Then, extract the digital fingerprints by any relevant means from the pseudo-gray-scale image. Several specific examples are given below. The resulting fingerprint is defined as the "3-D fingerprint" or "3-D fingerprint component" of the object.

In addition to using the 3-D representation on its own, the use of the 3-D fingerprint as a component of an authentication system that also uses other means to extract digital fingerprints of the object is also described. Below is a description of an embodiment that uses the 3-D fingerprint and the exterior surface and/or interior characteristics of the object in an integrated digital fingerprinting system.

The 3-D surface model described should have sufficient resolution to meet its required use. If it is to be used on its own to extract 3-D fingerprints, the surface and/or interior map should be captured with sufficient resolution to allow the extracted 3-D fingerprints to contain enough information to distinguish the object from other, similar objects based on shape and surface map alone. If the model is used in an "unwrapping" or "normal view" approach such as are described below, it must contain sufficient resolution to allow the steps dependent on it to be performed accurately.

Chroma- and Monochrome-Independent Surface Characteristics

There are many known ways to start with multiple images of an object and, provided there is significant variation in the images, construct a model of the imaged surface and/or interior that is invariant (in a least-squares sort of way) to the variations seen in the input images. Several approaches, for example, are known in the literature for achieving chroma invariance using multi-spectral illumination and multiple bands of color sensitivity in the imager.

The various described implementations do not require any particular approach to achieving either a chroma- or reflectivity-invariant representation of the surface and/or interior. Many approaches are suitable for use in the context of the present disclosure. Two possible approaches to chroma-invariance (1-dimensional and 2-dimensional) are given in the Appendix. A novel approach to monochrome invariance is also presented there. The monochrome invariance assumes for simplicity a Lambertian surface, but that restriction is easily removed (at the expense of somewhat more complex mathematics and the need to acquire some more images of the relevant surfaces and/or interior).

It should again be stressed that the methods disclosed herein are not dependent on any particular method of modeling either the chroma or the reflectance of the surface and/or interior of the object being fingerprinted. The monochrome-independent approach described in the Appendix also gives as a result of its mathematics the surface and/or interior normal at all (visible) points on the object. This gives a check on the 3-D mapping and also helps in the execution of the embodiments presented below.

Mapping the 3-D Surface to the (Multiple) Images

If multiple images are captured from different angles, the 3-D map can be calculated by normal stereo (or multi-image) mapping. One way that elegantly combines existing point-of-interest detection and characterization technology with multi-image mapping is given in the embodiment discussed below.

If the surface and/or interior location map is created by structured light or other method separate from the imaging process, the surface and/or interior image mapping produced in the previous section must be mapped to the 3-D structure produced in the first section. Image/surface projection techniques are well understood in the industry. The various embodiments require no particular approach to image mapping provided the method used maps the image elements to the 3-D surface and/or interior locations at a resolution sufficient to allow extraction of well-discriminating digital fingerprints.

Capturing the Digital Fingerprint

The goal is to produce a digital fingerprint of a rigid object that is as invariant as possible to changes in viewpoint angle, illumination, and all the kinds of change discussed above. Two ways to achieve this goal are presented as examples below and are not meant to be limiting. It will be seen by those skilled in the art that mathematically the two approaches are identical and that there are many other ways to achieve the same or effectively identical results. The two approaches, therefore, are presented as thought aids of imperfect physicality to understand what is going on mathematically.

Normal view. Because the surface and/or interior location and/or unit normal vector at each location are known, once the invariant chroma and reflectance maps are created, the point-of-interest characterizations can be determined, for example as though looking straight down onto a surface from a known distance and in a known orientation with a known illuminant. It will be seen how this removes all the forms of variability discussed above. From that view, points of interest can be discovered through any manner of means (the common approach of finding places where "a lot is happening" works well), each point of interest characterized by a feature vector, and that feature vector augmented by the three-dimensional coordinates of the point of interest on the surface. How these last three components are weighted relative to the other parts of the descriptors is outside the scope of this disclosure, though many ways may be found included simply running experiments to determine the relative weightings that give the best results for a given set of objects.

Surface unwrapping. Another, related approach is to treat the 3-D surface model as a 2-D manifold embedded in 3-space and to use standard techniques (e.g., Sammon mappings, and Hessian or Laplacian Eigenmaps) for "unwrapping" the manifold. The resulting flat surface then has points of interest detected and characterized and an aggregate feature vector (using either the original 3-space coordinates or the resulting 2-space ones) formed as above.

Description of an Embodiment

FIG. 1 is a simplified diagram of an example of a system for capturing an image of a rigid object 10 and generating a digital fingerprint of the object. An array 14 of sensors and emitters preferably is curved. In an embodiment, the array 14 is provisioned on the inside surface of a portion of a sphere near the center of which is placed the object 10. One possible array is shown in FIG. 3.

Figure 3:
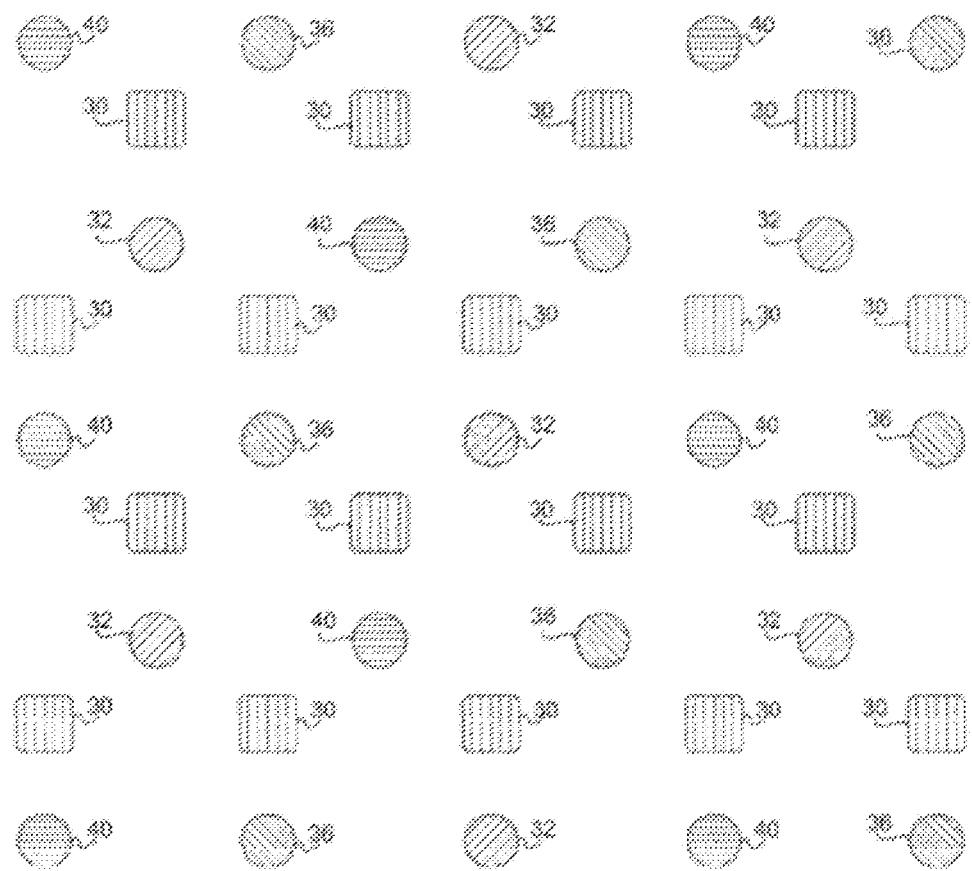
FIG. 3 is a simplified illustration of an example of an array of emitters and sensors that may be used in a system for capturing an image of a rigid object.
Figure 4:
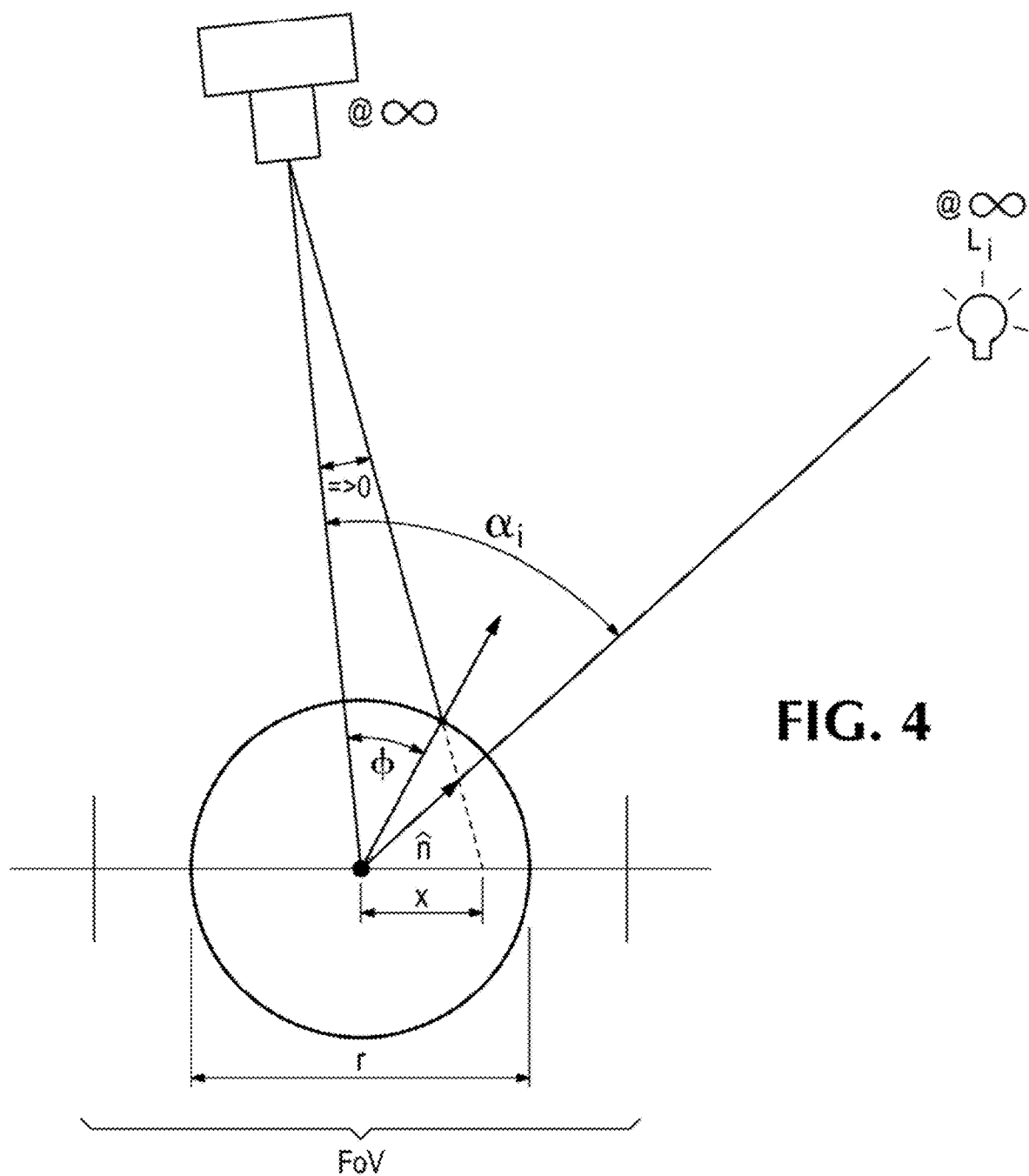
FIG. 4 is a conceptual diagram of a system for capturing an image of a rigid object.

In FIG. 3, sensors have reference number 30 and emitters are numbered red 32, green 36 and blue 40. The sensors 30 preferably have lenses that focus an area of the object onto the sensor receptors. Those lenses must be so focused and have sufficient depth of field that the part of the exterior surface and/or interior of the object in each field of view is sufficiently in focus to allow point of interest localization and characterization of sufficient quality to allow extraction of functional digital fingerprints as further described below.

This pattern illustrated in FIG. 3 may be repeated across the interior of the spherical segment surface. This is not meant to be a "design" of an emitter/sensor array but merely to suggest a possible one. In this embodiment, the field of view of each sensor is illuminated by at least one red, green, and blue emitter at approximately equal distance and intensity. Other sources of energy (e.g., X-ray sources, MRI sources, ultrasound transducers) may be employed. The sensors 30 have overlapping fields of view and the emitters 32, 36 and 40 have overlapping areas the emitters 32, 36 and 40 illuminate with the particular form of energy (e.g., electromagnetic energy, sound). Every point on the surface and/or of the interior of the object preferably is visible to four or more sensors and is illuminated by at least one of each emitter (e.g., each of four different color emitters).

Each sensor has one or more receptors (e.g., red, green, and blue receptors, not shown) that are tuned to substantially match the corresponding emitter frequencies. (As the equations in the Appendix show, it is not particularly critical how wide the emission spectra of the emitters or the sensitivity spectra of the sensors are, provided that they are broad enough to provide discrimination among objects similar except for their chroma and narrow enough to allow the equations of the Appendix to be at least approximately true.) The 3-space location of each sensor and each emitter is known. For each sensor, the orientation of the sensor and its angular field of view is known. In this embodiment, the lens-sensor system is aimed at the center of the sphere and a point object at that location will be at the center of the sensor's field of view.

Referring again to FIG. 1, the emitter-sensor array 14 is coupled to suitable interface electronics 16, both for powering the devices, and capturing signals output from the sensors. The electronics 16 are coupled to one or more processors or computers 18 for processing the captured signals. The processor(s) may execute software to process the signals as described below, to create a model of the object, and to create a digital fingerprint of the object from the model. The model, and the digital fingerprint, may be stored in a data store 22 by a suitable database system 20.

Creating the depth map: In one embodiment, a method for creating the depth map may proceed as follows. With all emitters on, each sensor images an object 10 placed at the center of the sphere. The object is presumed to be small enough so that every point of its visible surface and/or interior is in focus for at least two sensors (and preferably four). In each image, points of interest are located and characterized by some standard method. The purpose of this is to ensure that what is visible to more than one sensor can be aligned and its 3-space location determined. There should be sufficient resolution of the points of interest that essentially the entire surface and/or interior can be mapped (see below) to the required accuracy. In general, this accuracy will be sufficient when the surface is deemed "flat" over an area at the smallest point of interest characterization scale.

Points of interest in neighboring overlapping sensor fields of view are aligned and from that alignment, from the known orientation and field of view of the sensors, and from the location of the point-of-interest image on the sensor, it is possible to calculate the 3-space location of each point of interest on the surface and/or interior and hence, by interpolation, the 3-space location of each point on the surface and/or interior. Stereo distance calculation is straightforward with two sensors; in the case where three or more sensors can see the same location, the 3-space location of the points of interest can be calculated to minimum least-squares error. Once this is achieved, and, using the additional information generated about, for example surface normal vectors determined in the math shown in the Appendix or known in the field, the three-dimensional coordinates and outward-pointing unit surface normal vector at each point may be determined. ("Outward" may be defined from the center of the sphere so that the dot product of the surface normal vector and the line from the center to the surface at that point is non-negative or in some other consistent manner.)

Because the location of each surface and/or interior point in 3-space and the location of the image of that point on the relevant sensors are known, it is possible to map the images captured by each sensor onto the model surface and/or interior to produce a 3-D visible model of the object, were one desired.

Chroma and Reflectance Characterization

Now that the 3-D of the model has been determined, it remains to characterize the invariant properties of that surface and/or interior in addition to its location. The essential principle employed in determining the chroma and reflectance of the surface and/or interior features (which are independent of the illuminant) is to take sufficient images of each point on the surface and/or in the interior that the response of each point to essentially any illumination that falls within the range of the illuminants employed (whether different in color, orientation, reflectance, density, or intensity from the acquiring illumination) can be calculated. It should be stressed again that it is not necessary to actually calculate the response of the exterior surface and/or interior to some kind of "canonical" illumination. The approach tries to determine the characteristics that, if desired, would calculation of such a response, but since the points of interest are going to be located and characterized in the model itself, calculating a canonical illumination is unnecessary.

It will be noted in this embodiment that the points of interest are found and characterized twice, once from the images recorded by the sensors and once from the model of the object. The same techniques can apply in both cases. "Invariance" is achieved in the first case by having the sensors and lights close enough together so that the located and characterized points of interest are sufficiently overlapping in the near-by images to allow the images from neighboring sensors to be aligned and their 3-space locations calculated. It is achieved in the second by characterizing the invariant surface of the model.

Next the process calculates a chroma- and reflectance-invariant model of the surface. A few points are worth making at this juncture. First, while described in terms of seeking "invariance" in the model, it is only important to be invariant up to the changes in illumination, scale, etc. that are expected between the induction acquisition and the authentication acquisition. If it were known that both acquisitions were to be done with the same monochromatic blue light, for example, it would not be necessary to determine the chroma-invariant characterization of the model's surface—the reflectance model would be sufficient.

Second, it is not necessary that the induction and authentication stations be identical. It is only necessary that they allow the production of essentially identical models of the object. Finally, it may be necessary to assume a model of reflectance and one of chroma. Provided the chosen models can be mathematically described, the techniques described here can be extended to cover them, though the more complex the model (that is, the number of free parameters in the characterization), the greater the number of images of the object that must be captured to accurately build the model. The math in the Technical Note is for a Lambertian surface which suffices for many objects of interest including bags (luggage) and human faces. It is straightforward to extend that math for a linear combination of specular and Lambertian reflectance and (with somewhat more difficulty) to any model of surface reflectance including back- and sidescatter. It is also possible, and within view of this disclosure, to model the reflectance parametrically and use the multiple captured images to determine the parameters. The more parameters, the more varied the captured images must be and the more complex the mathematics to create the invariant model. Such variances are all within view in this disclosure.

Digital Fingerprint Creation

A model of the object that locates each point in 3-space, provides the surface normal vectors at least at each point on an exterior surface, characterizes the chroma and reflectance of each point, and ties all the information together into a single vector characterization of the points. In other words, we have produced an n-dimensional model of the object, that is, a model of the object wherein each point is characterized by an n-dimensional vector. Three of those parameters are the (x, y, z) location of the point (e.g., point on the exterior surface (with, possibly, the center of the sphere being the origin); point in the interior). The remainder are the chroma and reflectance parameters. The latter may be as few as one (a monochrome Lambertian surface, for example) or much higher, depending on the dimensionality of the normalized color map produced in determining the surface chroma and depending on the complexity of the reflectance model.

To the points of interest in this higher dimensional space we apply point of interest locators and characterizations and extract from the model the point of interest locations and characterizations that form the digital fingerprint of the object. We follow the same procedure at induction and authentication. If the model building has been successful, and if the object is rigid, two models of the same object should be very similar and the characteristics of the points of interest should not require any externally-imposed invariance (which as we have seen reduces their discriminatory ability).

In one embodiment, to find points of interest, one may begin with two independent variables (the x, y location on the image) and one dependent one (the gray-scale value of the image at that point), or alternatively three independent variables (the x, y, z location in three-dimensional space of the image) and one dependent one (the gray-scale value of the image at that point). A method such as DoG (difference of Gaussians) or Laplacian point of interest location can be applied to find candidate points of interest and then various normalized gradients to characterize the region around each point of interest. But there is nothing particularly special about a 3-dimensional feature space. With proper scaling (probably determined experimentally), the same techniques can be applied to k independent and m dependent variables in much the same way. In the embodiment shown here there are 3 independent variables (the x, y, z location of the interior points), one-three dependent variables for chroma, and some number (depending on reflectance model) for the reflectance.

How to Determine when Building the Model is Completed?

In a preferred embodiment, several images are captured of the object both at the same time and in rapid succession so that each point on the surface is hit with enough variable lighting to enable the 3D chroma- and reflectance-invariant model of the surface to be created. The user generally wants to take as few images as possible if for no other reason than to have the process work as rapidly as possible. But how does a user know when enough data has been captured? A simple approach will suffice: the model is sufficiently complete when the addition of new data does not materially change the model. In other words, if the model points are described by k independent variables and m dependent ones and the acquisition of another image changes none of them by more than a token amount, then the model may be considered to be complete. If the user was careful to ensure that the variations already captured cover the possible differences between induction and authentication, nothing further need be done.

Alitheon, Inc. Patent Application Publication No. U.S. 2019/0034694 "MODEL-BASED DIGITAL FINGERPRINTING" provides additional detail on three imaging approaches to illumination invariance. A first approach combines multiple images of the same object taken under different lighting conditions with the idea of producing an image that produces a more consistent digital fingerprint or that matches well enough the digital fingerprints of the individual images that go into creating the composite image.

A second approach combines the color planes of a single RGB object image to create a one-dimensional color mapping that can be made into a pseudo-gray-scale image from which digital fingerprints can be extracted. This approach was outlined in W. Maddern, et al., Illumination Invariant Imaging: Applications in Robust Vision-based Localisation, Mapping and Classification for Autonomous Vehicles.

A third approach starts with the concepts of the second approach, but develops a new approach that uses multiple images of the same object under different lighting conditions to create a one-dimensional mapping. As in the second case, the one-dimensional mapping can be transformed into a gray-scale image from which digital fingerprints may be extracted.

The distinction made above that the foregoing are "Imaging Approaches" is to distinguish two different (additional) approaches that are detailed in the Publication No. U.S. 2019/0034694. A first approach described in that publication starts with a set of images taken under different conditions and seeks to produce an image that is invariant to the changes that distinguish the input set of images. A second approach combines digital fingerprints from multiple images of the same object into a set that is used as a reference for that object. Processes to do this may include (1) "union of all digital fingerprints" and (2) "intersection of all digital fingerprints" though, in fact, there are many other ways to combine digital fingerprints for this purpose. The third approach is to make the digital fingerprints themselves invariant or less variant to changes in illumination.

In various implementations, a processor-based system acquires first image data of at least an interior portion of a first physical object. The processor-based system extracts at least one characterizing first digital fingerprint based at least in part on the first image data.

In one implementation, a processor-based system acquires first image data of only the interior portion of the first physical object without image data of an exterior portion of the first physical object. The image data may represent interior structures or features, for example in the form of measured or determined values for chroma, intensity, reflectivity, or density at various points in the interior of the first physical object, and may be derived via exposing the first physical object one or more forms of energy (e.g., light, infrared, magnetic, X-ray, ultrasound, sonar), and sensing the response. In this implementation, the processor-based system extracts the characterizing first digital fingerprint based on the first image data of only the interior portion of the first physical object without image data of an exterior portion of the first physical object. For example, the processor-based system may create a three-dimensional map of the interior portion of the first physical object. The processor-based system may convert the three-dimensional map into a digital representation of the interior portion. The processor-based system may generate the first digital fingerprint of the first physical object based on the digital representation. The processor-based system may store the first digital fingerprint to a non-transitory computer-readable storage medium for at least one of subsequent authentication, tracking, grading, and identification. Also for example, the processor-based system may detect a plurality of points of interest in the interior portion of the first physical object; characterize each point of interest by a respective feature vector; and augment each feature vector with at least one of three-dimensional coordinates of the respective point of interest. Also for example, processor-based system may, for example, generate a three dimensional model of the interior portion of the first physical object based on the image data. The processor-based system may, for example, generate or determine a digital fingerprint based on values at one or more points in the interior of the first physical object, which may, or may not, correspond to specified authentication regions.

In another implementation, a processor-based system acquires a first set of the first image data of only the interior portion of the first physical object without image data of an exterior portion of the first physical object and also acquires a second set of the first image data of only the exterior portion of the first physical object without image data of the interior portion of the first physical object. The first set of image data may represent interior structures or features, for example in the form of measured or determined values for chroma, intensity, reflectivity, or density at various points in the interior of the first physical object, and may be derived via exposing the first physical object one or more forms of energy (e.g., light, infrared, magnetic, X-ray, ultrasound, sonar), and sensing the response. The second set of image data may represent exterior structures or features (e.g., those on an exterior surface of the first physical object), for example in the form of measured or determined values for chroma, intensity, reflectivity, or density at various points in the interior of the first physical object, and may be derived via exposing the first physical object one or more forms of energy (e.g., light, infrared, magnetic, X-ray, ultrasound, sonar), and sensing the response. In this implementation, the characterizing first digital fingerprint includes two portions. In this implementation, the processor-based system extracts a first portion of the characterizing first digital fingerprint based on the first image data of only the interior portion of the first physical object without image data of an exterior portion of the first physical object, and separately extracts a second portion of the characterizing first digital fingerprint based on the first image data of only the exterior portion of the first physical object without image data of the interior portion of the first physical object. To extract the first portion of the characterizing first digital fingerprint the processor-based system may, for example, create a three-dimensional map of the interior portion of the first physical object and convert the three-dimensional map into a digital representation of the interior portion, for example as described above. To extract the second portion of the characterizing first digital fingerprint the processor-based system may, for example, create a two-dimensional map of the exterior surface of the first physical object and convert the two-dimensional map into a digital representation of the exterior surface, for example as described above. In some implementations, the processor-based system may, for example, generate a three dimensional model of the interior portion of the first physical object based on the image data and generate a two dimensional model of the exterior surface of the first physical object based on the image data. Alternatively, processor-based system may, for example, generate a three dimensional model of the first physical object including both the exterior surface and the interior based on the image data. The processor-based system may, for example, generate or determine a digital fingerprint based on values at one or more points in the interior and/or on the exterior surface of the first physical object, which may, or may not, correspond to specified authentication regions.

In yet another implementation, a processor-based system acquires first image data of the interior portion and the exterior portion of the first physical object. In this implementation, the processor-based system extracts the characterizing first digital fingerprint based on the first image data of the interior portion and the exterior portion of the first physical object. The processor-based system may, for example, generate a three dimensional model of the first physical object including both the exterior surface and the interior based on the image data. The processor-based system may, for example, generate or determine a digital fingerprint based on values at one or more points in the interior and on the exterior surface of the first physical object, which may, or may not, correspond to specified authentication regions.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

The various embodiments described above can be combined to provide further embodiments. All of the commonly assigned US patent application publications, US patent applications, foreign patents, and foreign patent applications referred to in this specification and/or listed in the Application Data Sheet, including but not limited to U.S. provisional patent application No. 62/967,009, filed Jan. 28, 2020.

At least some of the equipment discussed in the present disclosure comprises hardware and associated software. For example, the typical electronic device is likely to include one or more processors and software executable on those processors to carry out the operations described. The term software is used herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present disclosure may include executable programs or instructions that are stored in machine-readable or computer-readable storage media, such as a digital memory. No implication is made that a "computer" in the conventional sense is required in any particular embodiment. For example, various processors, embedded or otherwise, may be used in equipment such as the components described herein.

Memory for storing software is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized herein, may be used to make a software product. That said, it is also known that software can be distributed via electronic transmission ("download"), in which case there typically will be a corresponding software product at the transmitting end of the transmission, or the receiving end, or both.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A digital fingerprinting method, the method comprising:
    acquiring first stereo image data of at least an interior portion of a first physical object;
    extracting a characterizing first digital fingerprint based at least in part on the first stereo image data; and
    inducting the first physical object into a reference database system by storing a record in the reference database system that includes the characterizing first digital fingerprint, wherein the characterizing first digital fingerprint includes characterizations of points of interest that are internal to an exterior surface of the first physical object and uniquely identifies the first physical object from other physical objects of a same type or class of physical objects as the first physical object based on intrinsic characteristics of the first physical object, including intrinsic characteristics of the interior portion of the first physical object, without relying on any tag, label, or other extrinsic identifier added to the first physical object for identification.

2. The method of claim 1, further comprising:
    scanning a second physical object to capture second stereo image data of at least an interior portion of the second physical object;
    extracting a characterizing second digital fingerprint based at least in part on the second stereo image data, wherein characterizing the second digital fingerprint includes characterizations of points of interest that are internal to an exterior surface of the second physical object;
    comparing the characterizing second digital fingerprint to the characterizing first digital fingerprint to attempt to authenticate the second physical object with respect to the first physical object; and
    generating a report based on the comparison.

3. The method of claim 2 wherein comparing the characterizing second digital fingerprint to the characterizing first digital fingerprint to attempt to authenticate the second physical object with respect to the first physical object includes comparing the characterizing second digital fingerprint to the characterizing first digital fingerprint to attempt to determine whether the second physical object is the same physical object as the first physical object.

4. The method of claim 2 wherein comparing the characterizing second digital fingerprint to the characterizing first digital fingerprint to attempt to authenticate the second physical object with respect to the first physical object includes comparing the characterizing second digital fingerprint to the characterizing first digital fingerprint to attempt to determine whether the second physical object is a reappearance of the first physical object.

5. The method of claim 2 wherein comparing the characterizing second digital fingerprint to the characterizing first digital fingerprint to attempt to authenticate the second physical object with respect to the first physical object includes comparing the characterizing second digital fingerprint to the characterizing first digital fingerprint to attempt to determine whether the second physical object is a portion taken of the first physical object, the portion removed from the first physical object.

6. The method of claim 1 wherein extracting a characterizing first digital fingerprint based at least in part on the first stereo image data includes:
    creating a three-dimensional map of the interior portion of the first physical object, the three-dimensional map including multiple slices of the physical object that are obtained at different depths, at least one slice of the multiple slices including a plurality of points of interest;

converting the three-dimensional map into a digital representation of the interior portion;

generating the first digital fingerprint of the first physical object based on the digital representation, the first digital fingerprint of the physical object including an aggregation of the characterizations of points of interest in each of the multiple slices; and storing the first digital fingerprint to a non-transitory computer-readable storage medium for at least one of subsequent authentication, tracking, grading, and identification.

7. The method of claim 1 wherein extracting a characterizing first digital fingerprint based at least in part on the first stereo image data includes:

detecting a plurality of points of interest in the interior portion of the first physical object;

characterizing each point of interest by a respective feature vector; and augmenting each feature vector with at least one of three-dimensional coordinates of the respective point of interest.

8. The method of claim 7 wherein extracting a characterizing first digital fingerprint based at least in part on the first stereo image data further includes:

identifying a plurality of points of interest on the portion of the surface of the first physical object; and producing an n-dimensional model of the first physical object, wherein each of the identified plurality of points of interest is characterized by an n-dimensional vector associated with a plurality of parameters including at least one of: an (x, y, z) location of the corresponding identified point of interest on the portion of the surface of the first physical object, a surface shape characteristic, chroma, and reflectance.

9. The method of claim 1 wherein extracting a characterizing first digital fingerprint based at least in part on the first stereo image data includes:

identifying a plurality of points of interest on the portion of the surface of the first physical object; and producing an n-dimensional model of the first physical object, wherein each of the identified plurality of points of interest is characterized by an n-dimensional vector.

10. The method of claim 9 wherein producing an n-dimensional model of the first physical object, wherein each of the identified plurality of points of interest is characterized by an n-dimensional vector includes:

producing the n-dimensional model of the first physical object, wherein each of the identified plurality of points of interest is characterized by a respective n-dimensional vector associated with a plurality of parameters including at least one of: an (x, y, z) location of the corresponding identified point of interest on the portion of the surface of the first physical object, a surface shape characteristic, chroma, and reflectance.

11. The method of claim 1 wherein acquiring first stereo image data of at least an interior portion of a first physical object includes acquiring first stereo image data of only the interior portion of the first physical object without image data of an exterior portion of the first physical object, and extracting a characterizing first digital fingerprint based at least in part on the first stereo image data includes extracting the characterizing first digital fingerprint based on the first stereo image data of only the interior portion of the first physical object without image data of an exterior portion of the first physical object.

12. The method of claim 1 wherein acquiring first stereo image data of at least an interior portion of a first physical object includes: acquiring a first set of the first stereo image data of only the interior portion of the first physical object without image data of an exterior portion of the first physical object, acquiring a second set of the first stereo image data of only the exterior portion of the first physical object without image data of the interior portion of the first physical object.

13. The method of claim 12 wherein the characterizing first digital fingerprint includes two portions, and extracting a characterizing first digital fingerprint based at least in part on the first stereo image data includes: extracting a first portion of the characterizing first digital fingerprint based on the first stereo image data of only the interior portion of the first physical object without image data of an exterior portion of the first physical object, and extracting a second portion of the characterizing first digital fingerprint based on the first stereo image data of only the exterior portion of the first physical object without image data of the interior portion of the first physical object.

14. The method of claim 1 wherein acquiring first stereo image data of at least an interior portion of a first physical object includes acquiring first stereo image data of the interior portion and an exterior portion of the first physical object, and extracting a characterizing first digital fingerprint based at least in part on the first stereo image data includes extracting the characterizing first digital fingerprint based on the first stereo image data of the interior portion and the exterior portion of the first physical object.

15. A system comprising:

at least one processor;

at least one nontransitory computer-readable medium communicatively coupled to the at least one processor, the at least one nontransitory computer-readable medium which stores processor-executable instructions, which, when executed by the at least one processor cause the at least one processor to:

acquire first stereo image data of at least an interior portion of a first physical object;

extract a characterizing first digital fingerprint based at least in part on the first stereo image data; and induct the first physical object into a reference database system by storing a record in the reference database system that includes the characterizing first digital fingerprint, wherein the characterizing digital fingerprint includes characterizations of points of interest that are internal to an exterior surface of the first physical object and uniquely identifies the first physical object from other physical objects of a same type or class of physical objects as the first physical object based on intrinsic characteristics of the first physical object, including intrinsic characteristics of the interior portion of the first physical object, without relying on any tag, label, or other extrinsic identifier added to the first physical object for identification.

16. The system of claim 15, wherein the processor-executable instructions cause the at least one processor further to:

scan a second physical object to capture second stereo image data of at least an interior portion of the second physical object;

extract a characterizing second digital fingerprint based at least in part on the second stereo image data, wherein characterizing the second digital fingerprint includes characterizations of points of interest that are internal to an exterior surface of the second physical object;

compare the characterizing second digital fingerprint to the characterizing first digital fingerprint to attempt to authenticate the second physical object with respect to the first physical object; and generate a report based on the comparison.

17. The system of claim 16 wherein to compare the characterizing second digital fingerprint to the characterizing first digital fingerprint to attempt to authenticate the second physical object with respect to the first physical object, the processor-executable instructions cause the at least one processor to compare the characterizing second digital fingerprint to the characterizing first digital fingerprint to attempt to determine whether the second physical object is the same physical object as the first physical object.

18. The system of claim 16 wherein to compare the characterizing second digital fingerprint to the characterizing first digital fingerprint to attempt to authenticate the second physical object with respect to the first physical object, the processor-executable instructions cause the at least one processor to compare the characterizing second digital fingerprint to the characterizing first digital fingerprint to attempt to determine whether the second physical object is a reappearance of the first physical object.

19. The system of claim 16 wherein to compare the characterizing second digital fingerprint to the characterizing first digital fingerprint to attempt to authenticate the second physical object with respect to the first physical object, the processor-executable instructions cause the at least one processor to compare the characterizing second digital fingerprint to the characterizing first digital fingerprint to attempt to determine whether the second physical object is a portion taken of the first physical object, the portion removed from the first physical object.

20. The system of claim 15 wherein to extract a characterizing first digital fingerprint based at least in part on the first stereo image data, the processor-executable instructions cause the at least one processor to:

create a three-dimensional map of the interior portion of the first physical object, the three-dimensional map including multiple slices of the physical object that are obtained at different depths, at least one slice of the multiple slices including a plurality of points of interest;

convert the three-dimensional map into a digital representation of the interior portion, the first digital fingerprint of the physical object including an aggregation of the characterizations of points of interest in each of the multiple slices;

generate the first digital fingerprint of the first physical object based on the digital representation; and store the first digital fingerprint to a non-transitory computer-readable storage medium for at least one of subsequent authentication, tracking, grading, and identification.

21. The system of claim 15 wherein to extract a characterizing first digital fingerprint based at least in part on the first stereo image data, the processor-executable instructions cause the at least one processor to:

detect a plurality of points of interest in the interior portion of the first physical object;

characterize each point of interest by a respective feature vector; and augment each feature vector with at least one of three-dimensional coordinates of the respective point of interest.

22. The system of claim 21 wherein to extract a characterizing first digital fingerprint based at least in part on the first stereo image data, the processor-executable instructions cause the at least one processor further to:

identify a plurality of points of interest on the portion of the surface of the first physical object; and produce an n-dimensional model of the first physical object, wherein each of the identified plurality of points of interest is characterized by an n-dimensional vector associated with a plurality of parameters including at least one of: an (x, y, z) location of the corresponding identified point of interest on the portion of the surface of the first physical object, a surface shape characteristic, chroma, and reflectance.

23. The system of claim 15 wherein to extract a characterizing first digital fingerprint based at least in part on the first stereo image data, the processor-executable instructions cause the at least one processor to:

identify a plurality of points of interest on the portion of the surface of the first physical object; and produce an n-dimensional model of the first physical object, wherein each of the identified plurality of points of interest is characterized by an n-dimensional vector.

24. The system of claim 23 wherein to produce an n-dimensional model of the first physical object, wherein each of the identified plurality of points of interest is characterized by an n-dimensional vector, the processor-executable instructions cause the at least one processor to:

produce the n-dimensional model of the first physical object, wherein each of the identified plurality of points of interest is characterized by a respective n-dimensional vector associated with a plurality of parameters including at least one of: an (x, y, z) location of the corresponding identified point of interest on the portion of the surface of the first physical object, a surface shape characteristic, chroma, and reflectance.

25. The system of claim 15 wherein to acquire first stereo image data of at least an interior portion of a first physical object, the processor-executable instructions cause the at least one processor to acquire first stereo image data of only the interior portion of the first physical object without image data of an exterior portion of the first physical object, and to extract a characterizing first digital fingerprint based at least in part on the first stereo image data, the processor-executable instructions cause the at least one processor to extract the characterizing first digital fingerprint based on the first stereo image data of only the interior portion of the first physical object without image data of an exterior portion of the first physical object.

26. The system of claim 15 wherein to acquire first stereo image data of at least an interior portion of a first physical object, the processor-executable instructions cause the at least one processor to: acquire a first set of the first stereo image data of only the interior portion of the first physical object without image data of an exterior portion of the first physical object, and to acquire a second set of the first stereo image data of only the exterior portion of the first physical object without image data of the interior portion of the first physical object.

27. The system of claim 26 wherein the characterizing first digital fingerprint includes two portions, and to extract a characterizing first digital fingerprint based at least in part on the first stereo image data, the processor-executable instructions cause the at least one processor to: extracts a first portion of the characterizing first digital fingerprint based on the first stereo image data of only the interior portion of the first physical object without image data of an exterior portion of the first physical object, and extract a second portion of the characterizing first digital fingerprint based on the first stereo image data of only the exterior portion of the first physical object without image data of the interior portion of the first physical object.

28. The system of claim 15 wherein to acquire first stereo image data of at least an interior portion of a first physical object, the processor-executable instructions cause the at least one processor to acquire first stereo image data of the interior portion and an exterior portion of the first physical object, and to extract a characterizing first digital fingerprint based at least in part on the first stereo image data, the processor-executable instructions cause the at least one processor to extract the characterizing first digital fingerprint based on the first stereo image data of the interior portion and the exterior portion of the first physical object.

\* \* \* \* \*